US010396917B2

(12) United States Patent
Hasarchi et al.

(10) Patent No.: US 10,396,917 B2
(45) Date of Patent: Aug. 27, 2019

(54) AUTOMATIC MAPPING AND HANDLING PIM AND OTHER UPLINK INTERFERENCES IN DIGITAL DISTRIBUTED ANTENNA SYSTEMS

(71) Applicant: Axell Wireless Ltd., Chesham, Buckinghamshire (GB)

(72) Inventors: Abraham Hasarchi, Petach Tikva (IL); Amir Meir, Petach Tikva (IL)

(73) Assignee: AXELL WIRELESS LTD., Buckinghamshire (GB)

( * ) Notice: Subject to any disclaimer, the term of this patent is extended or adjusted under 35 U.S.C. 154(b) by 0 days.

(21) Appl. No.: 15/510,738

(22) PCT Filed: Sep. 22, 2015

(86) PCT No.: PCT/US2015/051412
§ 371 (c)(1),
(2) Date: Mar. 13, 2017

(87) PCT Pub. No.: WO2016/049002
PCT Pub. Date: Mar. 31, 2016

(65) Prior Publication Data
US 2017/0250765 A1  Aug. 31, 2017

Related U.S. Application Data

(60) Provisional application No. 62/054,052, filed on Sep. 23, 2014.

(51) Int. Cl.
*H04B 17/345* (2015.01)
*H04B 17/23* (2015.01)
*H04B 17/382* (2015.01)

(52) U.S. Cl.
CPC .......... *H04B 17/345* (2015.01); *H04B 17/23* (2015.01); *H04B 17/382* (2015.01)

(58) Field of Classification Search
None
See application file for complete search history.

(56) References Cited

U.S. PATENT DOCUMENTS 5,621,786 A   4/1997  Fischer et al.
5,642,405 A   6/1997  Fischer et al.
(Continued)

FOREIGN PATENT DOCUMENTS

EP   2092363 B1   3/2013
EP   2327272 B1   6/2013
(Continued)

OTHER PUBLICATIONS

Official Action dated Aug. 17, 2018, from Canada Application No. 2,961,696, 4 sheets.
(Continued)

*Primary Examiner* — Anh Ngoc M Nguyen
(74) *Attorney, Agent, or Firm* — Katten Muchin Rosenman LLP

(57) ABSTRACT

Disclosed herein is an algorithm that leverages the unique features and capabilities of a DCC-DAS in order to perform automatic measurements of uplink noise, PIM, and any uplink interference. Once an interference in the uplink is detected, this algorithm may automatically measure its parameters such as frequency, intensity, bandwidth, etc., and identify the source of the problem. It may automatically isolate and identify which element or cable of the DCC-DAS is the root cause of the problem or also which external source is generating the problem.

23 Claims, 10 Drawing Sheets

(56) References Cited

U.S. PATENT DOCUMENTS

| | | | |
|---|---|---|---|
| 5,644,622 A | 7/1997 | Russell et al. |
| 5,809,422 A | 9/1998 | Raleigh et al. |
| 5,852,651 A | 12/1998 | Fischer et al. |
| 5,880,863 A | 3/1999 | Rideout et al. |
| 5,922,051 A | 7/1999 | Sidey |
| 6,112,086 A | 8/2000 | Wala |
| 6,151,480 A | 11/2000 | Fischer et al. |
| 6,205,133 B1 | 3/2001 | Bexten |
| 6,308,085 B1 | 10/2001 | Shoki |
| 6,657,993 B1 | 12/2003 | Casanova et al. |
| 6,801,767 B1 | 10/2004 | Schwartz et al. |
| 6,804,540 B1 | 10/2004 | Shepherd et al. |
| 6,836,660 B1 | 12/2004 | Wala |
| 7,103,377 B2 | 9/2006 | Bauman et al. |
| 7,171,244 B2 | 1/2007 | Bauman |
| 7,173,183 B2 | 2/2007 | McMahon et al. |
| 7,194,275 B2 | 3/2007 | Bolin et al. |
| 7,245,603 B1 | 7/2007 | Lucidarme et al. |
| 7,286,507 B1 * | 10/2007 | Oh .................. H04W 16/26 370/312 |
| 7,398,106 B2 | 7/2008 | Conyers et al. |
| RE40,564 E | 11/2008 | Fischer et al. |
| 7,483,504 B2 | 1/2009 | Shapira et al. |
| 7,539,509 B2 | 5/2009 | Bauman et al. |
| 7,546,138 B2 | 6/2009 | Bauman |
| 7,554,946 B2 | 6/2009 | Conyers et al. |
| 7,574,234 B2 | 8/2009 | Conyers et al. |
| 7,577,439 B2 | 8/2009 | Halonen |
| 7,599,711 B2 | 10/2009 | Hermel et al. |
| 7,668,153 B2 | 2/2010 | Zavadsky |
| 7,688,135 B2 | 3/2010 | Kim et al. |
| 7,761,093 B2 | 7/2010 | Sabat, Jr. et al. |
| 5,627,879 C1 | 9/2010 | Russell et al. |
| 5,657,374 C1 | 9/2010 | Russell et al. |
| 7,805,073 B2 | 9/2010 | Sabat, Jr. et al. |
| 7,822,148 B2 | 10/2010 | Shapira et al. |
| 7,917,177 B2 | 3/2011 | Bauman |
| 7,933,572 B1 | 4/2011 | Johnson |
| 7,961,618 B1 | 6/2011 | Prasad et al. |
| 7,961,689 B2 | 6/2011 | Stratford |
| 8,005,050 B2 | 8/2011 | Scheinert et al. |
| 8,005,152 B2 | 8/2011 | Wegener |
| 8,009,613 B1 | 8/2011 | Gunasekara et al. |
| 8,050,246 B2 | 11/2011 | Wala et al. |
| 8,064,850 B2 | 11/2011 | Yang et al. |
| 8,107,464 B2 | 1/2012 | Schmidt et al. |
| 8,135,102 B2 | 3/2012 | Wiwel et al. |
| 8,135,273 B2 | 3/2012 | Sabat, Jr. et al. |
| 8,149,950 B2 | 4/2012 | Kim et al. |
| 8,165,169 B2 | 4/2012 | Hedin et al. |
| 8,174,428 B2 | 5/2012 | Wegener |
| 8,194,597 B2 | 6/2012 | Feder et al. |
| 8,224,266 B2 | 7/2012 | Liu et al. |
| 8,274,332 B2 | 9/2012 | Cho et al. |
| 8,306,563 B2 | 11/2012 | Zavadsky et al. |
| 8,326,238 B2 | 12/2012 | Yang et al. |
| 8,326,324 B2 | 12/2012 | Wu et al. |
| 8,340,605 B2 | 12/2012 | Hou et al. |
| 8,351,877 B2 | 1/2013 | Kim et al. |
| 8,380,143 B2 | 2/2013 | Yang et al. |
| 8,396,368 B2 | 3/2013 | Tarlazzi et al. |
| 8,400,292 B2 | 3/2013 | Kummetz |
| 8,401,499 B2 | 3/2013 | Kim et al. |
| 8,412,206 B2 | 4/2013 | Kwon et al. |
| 8,452,305 B2 | 5/2013 | Brisebois et al. |
| 8,467,747 B2 | 6/2013 | Kim et al. |
| 8,472,409 B2 | 6/2013 | Sun et al. |
| 8,472,897 B1 | 6/2013 | Yang |
| 8,472,963 B2 | 6/2013 | Caire |
| 8,483,702 B2 | 7/2013 | Noriega et al. |
| 8,509,347 B2 | 8/2013 | Kim et al. |
| 8,526,388 B1 | 9/2013 | Kaukovuori et al. |
| 8,542,768 B2 | 9/2013 | Kim et al. |
| 8,548,403 B2 | 10/2013 | Kim et al. |
| 9,179,321 B2 | 11/2015 | Hasarchi et al. |
| 2002/0075906 A1 | 6/2002 | Cole et al. |
| 2002/0093926 A1 | 7/2002 | Kilfoyle |
| 2003/0181221 A1 | 9/2003 | Nguyen |
| 2003/0236067 A1 | 12/2003 | Hasarchi et al. |
| 2004/0106435 A1 | 6/2004 | Bauman et al. |
| 2005/0041968 A1 | 2/2005 | Takahashi |
| 2005/0152695 A1 | 7/2005 | Sulzberger et al. |
| 2006/0094470 A1 | 5/2006 | Wake et al. |
| 2006/0209752 A1 | 9/2006 | Wijngaarden et al. |
| 2007/0087756 A1 | 4/2007 | Hoffberg |
| 2007/0135042 A1 * | 6/2007 | Shiff .................. H01Q 1/2208 455/13.3 |
| 2007/0243899 A1 | 10/2007 | Hermel et al. |
| 2007/0253714 A1 | 11/2007 | Seeds et al. |
| 2007/0274279 A1 | 11/2007 | Wood et al. |
| 2008/0009244 A1 | 1/2008 | Lee |
| 2008/0051129 A1 | 2/2008 | Abe et al. |
| 2008/0058018 A1 | 3/2008 | Scheinert |
| 2008/0124087 A1 | 5/2008 | Hartmann et al. |
| 2008/0181282 A1 | 7/2008 | Wala et al. |
| 2008/0194226 A1 | 8/2008 | Rivas et al. |
| 2008/0219392 A1 | 9/2008 | Riani et al. |
| 2008/0225816 A1 | 9/2008 | Osterling et al. |
| 2008/0232328 A1 | 9/2008 | Scheinert et al. |
| 2008/0265996 A1 | 10/2008 | Kim et al. |
| 2009/0005096 A1 | 1/2009 | Scheinert |
| 2009/0029664 A1 | 1/2009 | Batruni |
| 2009/0061939 A1 | 3/2009 | Andersson et al. |
| 2009/0061940 A1 | 3/2009 | Scheinert et al. |
| 2009/0085658 A1 | 4/2009 | Liu et al. |
| 2009/0180423 A1 | 7/2009 | Kroener |
| 2009/0180426 A1 | 7/2009 | Sabat et al. |
| 2009/0285194 A1 | 11/2009 | Kim et al. |
| 2010/0002626 A1 | 1/2010 | Schmidt et al. |
| 2010/0002661 A1 | 1/2010 | Schmidt et al. |
| 2010/0008669 A1 | 1/2010 | Rhy et al. |
| 2010/0014494 A1 | 1/2010 | Schmidt et al. |
| 2010/0177759 A1 | 7/2010 | Fischer et al. |
| 2010/0177760 A1 | 7/2010 | Cannon et al. |
| 2010/0178936 A1 | 7/2010 | Wala et al. |
| 2010/0202356 A1 | 8/2010 | Fischer et al. |
| 2010/0208777 A1 | 8/2010 | Ogaz |
| 2010/0271957 A1 | 10/2010 | Stapleton et al. |
| 2010/0296458 A1 | 11/2010 | Wala et al. |
| 2010/0296816 A1 | 11/2010 | Larsen |
| 2011/0028157 A1 | 2/2011 | Larsen |
| 2011/0039497 A1 | 2/2011 | Hammarwall et al. |
| 2011/0122772 A1 | 5/2011 | Stuart |
| 2011/0122788 A1 | 5/2011 | Sombrutzki et al. |
| 2011/0135308 A1 | 6/2011 | Tarlazzi et al. |
| 2011/0141895 A1 | 6/2011 | Zhang |
| 2011/0156815 A1 | 6/2011 | Kim et al. |
| 2011/0158081 A1 | 6/2011 | Wang et al. |
| 2011/0177827 A1 | 7/2011 | Crilly, Jr. et al. |
| 2011/0201269 A1 | 8/2011 | Hobbs et al. |
| 2011/0201368 A1 | 8/2011 | Faccin et al. |
| 2011/0244785 A1 | 10/2011 | Scheinert |
| 2011/0268449 A1 | 11/2011 | Berlin et al. |
| 2011/0312359 A1 | 12/2011 | Kolding et al. |
| 2012/0039254 A1 | 2/2012 | Stapleton et al. |
| 2012/0039320 A1 | 2/2012 | Lemson et al. |
| 2012/0039321 A1 | 2/2012 | Ghosh et al. |
| 2012/0046038 A1 | 2/2012 | Gao et al. |
| 2012/0057572 A1 | 3/2012 | Evans et al. |
| 2012/0069880 A1 | 3/2012 | Lemson et al. |
| 2012/0076027 A1 | 3/2012 | Akyildiz et al. |
| 2012/0106404 A1 | 5/2012 | Damnjanovic |
| 2012/0106657 A1 | 5/2012 | Fischer et al. |
| 2012/0134279 A1 | 5/2012 | Tamaki |
| 2012/0134666 A1 | 5/2012 | Casterline et al. |
| 2012/0135695 A1 | 5/2012 | Yang et al. |
| 2012/0178483 A1 | 7/2012 | Rosenau |
| 2012/0189074 A1 | 7/2012 | Jin et al. |
| 2012/0207145 A1 | 8/2012 | Han et al. |
| 2012/0257516 A1 | 10/2012 | Pazhyannur et al. |
| 2012/0275530 A1 | 11/2012 | Nazar et al. |
| 2012/0281565 A1 | 11/2012 | Sauer |
| 2012/0314797 A1 | 12/2012 | Kummetz et al. |
| 2012/0321314 A1 | 12/2012 | Oren et al. |

(56) References Cited

U.S. PATENT DOCUMENTS

| | | |
|---|---|---|
| 2012/0322501 A1 | 12/2012 | Abouzid et al. |
| 2013/0005375 A1 | 1/2013 | Chen |
| 2013/0009707 A1 | 1/2013 | Kim et al. |
| 2013/0017863 A1 | 1/2013 | Kummetz et al. |
| 2013/0028218 A1 | 1/2013 | Chun et al. |
| 2013/0040676 A1 | 2/2013 | Kang et al. |
| 2013/0045755 A1 | 2/2013 | Davis |
| 2013/0050054 A1 | 2/2013 | Chan et al. |
| 2013/0077713 A1 | 3/2013 | Kim et al. |
| 2013/0079035 A1 | 3/2013 | Wala et al. |
| 2013/0084886 A1 | 4/2013 | Crilly et al. |
| 2013/0095870 A1 | 4/2013 | Phillips et al. |
| 2013/0095871 A1 | 4/2013 | Soriaga et al. |
| 2013/0114486 A1 | 5/2013 | Spedaliere et al. |
| 2013/0114963 A1 | 5/2013 | Stapleton et al. |
| 2013/0121703 A1 | 5/2013 | Kummetz et al. |
| 2013/0122946 A1 | 5/2013 | Zhu |
| 2013/0128760 A1 | 5/2013 | Fujishima et al. |
| 2013/0128810 A1 | 5/2013 | Lee et al. |
| 2013/0143598 A1 | 6/2013 | Srinivasan et al. |
| 2013/0147550 A1 | 6/2013 | Yang et al. |
| 2013/0150065 A1 | 6/2013 | Elliott et al. |
| 2013/0201916 A1 | 8/2013 | Kummetz et al. |
| 2013/0236180 A1 | 9/2013 | Kim et al. |
| 2013/0243124 A1 | 9/2013 | Yang et al. |
| 2013/0251066 A1 | 9/2013 | Kim et al. |
| 2013/0272202 A1 | 10/2013 | Stapleton et al. |
| 2013/0272696 A1 | 10/2013 | Palanisamy et al. |
| 2013/0295980 A1* | 11/2013 | Reuven ............... H04B 17/345 455/514 |
| 2013/0315291 A1 | 11/2013 | Kim et al. |
| 2013/0329825 A1 | 12/2013 | Oren et al. |
| 2013/0331136 A1 | 12/2013 | Yang et al. |
| 2013/0336370 A1 | 12/2013 | Jovanovic et al. |
| 2013/0337750 A1 | 12/2013 | Ko |
| 2014/0024402 A1 | 1/2014 | Singh |
| 2014/0031047 A1 | 1/2014 | Jovanovic et al. |
| 2014/0057627 A1 | 2/2014 | Hejazi et al. |
| 2014/0072299 A1 | 3/2014 | Stapleton et al. |
| 2014/0078939 A1* | 3/2014 | Shirani-Mehr ....... H04W 52/24 370/277 |
| 2014/0161057 A1 | 6/2014 | Hejazi et al. |
| 2014/0162644 A1 | 6/2014 | Ou |
| 2014/0162664 A1 | 6/2014 | Stapleton et al. |
| 2014/0169794 A1 | 6/2014 | Notargiacomo |
| 2014/0233548 A1 | 8/2014 | Leizerovich et al. |
| 2014/0241258 A1 | 8/2014 | Zack et al. |
| 2014/0269318 A1 | 9/2014 | Hasarchi et al. |
| 2016/0007205 A1 | 1/2016 | Hasarchi et al. |

FOREIGN PATENT DOCUMENTS

| | | | |
|---|---|---|---|
| EP | 2789107 A1 | 10/2014 | |
| EP | 2789107 | 2/2017 | |
| KR | 2011085828 A | 7/2011 | |
| KR | 1541262 | 7/2015 | |
| WO | WO2011100219 A1 | 8/2011 | |
| WO | WO2011123336 A1 | 10/2011 | |
| WO | WO2012024349 A1 | 2/2012 | |
| WO | WO2012033659 A1 | 3/2012 | |
| WO | WO2012159303 A1 | 11/2012 | |
| WO | WO2013028197 A1 | 2/2013 | |
| WO | WO2013003717 A3 | 3/2013 | |
| WO | WO2013033199 A1 | 3/2013 | |
| WO | 2014-026005 | 2/2014 | |
| WO | 2014/026005 A1 | 2/2014 | |
| WO | 2014/026005 A1 | 2/2014 | |
| WO | 2014-040608 | 3/2014 | |
| WO | 2014/040608 A1 | 3/2014 | |
| WO | 2014/040608 A1 | 3/2014 | |
| WO | 2014040608 A1 | 3/2014 | |
| WO | 2016/049002 | 3/2016 | |
| WO | 2016/105478 | 6/2016 | |

OTHER PUBLICATIONS

The extended European search report dated Jul. 23, 2018, from the corresponding EP Application No. 15873767.6, 10 sheets.
Examination report No. 1 for standard patent application dated Jan. 8, 2018, from the corresponding Australian Application No. 2015371287.
Supplementary European Search Report dated Oct. 7, 2015, from the corresponding EP Application No. 13827591.2-1857.
Non-final Rejection dated Dec. 15, 2014, from the corresponding U.S. Appl. No. 14/360,026.
Notice of Allowance dated Jul. 27, 2015, from the corresponding U.S. Appl. No. 14/360,026.
International Search Report and Written Opinion dated Feb. 23, 2016, from the corresponding PCT/US2015/051412.
International Preliminary Report on Patentability dated Mar. 28, 2017, from the corresponding PCT/US2015/051412.
International Search Report and Written Opinion dated Apr. 19, 2016, from the corresponding PCT/US2015/000203.
Final Rejection dated Jan. 9, 2017, from the corresponding U.S. Appl. No. 14/853,123.
Non-Final Rejection dated Jun. 16, 2016, from the corresponding U.S. Appl. No. 14/853,123.
Office Action dated Oct. 28, 2014, from the corresponding KR 10-2014-7012918.
International Preliminary Report on Patentability and Written Opinion of the International Searching Authority dated Feb. 10, 2015 from corresponding Application No. PCT/US2013/054143.
U.S. Office Action dated Dec. 15, 2014 from corresponding U.S. Appl. No. 14/360,026.
The extended European search report dated Apr. 20, 2018, from the corresponding EP Application No. 15845418, 7 sheets.
Official Action dated Oct. 18, 2018, from Canada Application No. 2,971,853, 4 sheets.
International Search Report dated Nov. 20, 2013, from the corresponding PCT/US2013/054143.
"CDMA Co-Pilot Beacon Transmitter", Cellular Specialties, Inc.: Co-Pilot Beacon, Jun. 6, 2012.
Gary Williamson, "Increasing In-Building Capacity with WiFi Offload", NEXIUS, Apr. 25, 2012, pp. 1 to 3.
"Overcoming Barriers to Communication 3000 Distributed Antenna System", Pacific Wave Wireless Zinwave, In-Building Cellular and Wireless Technology, www.pactificwave-wireless.com, Jan. 23, 2012.
Hartmann, P., et. al., "Wideband fibre-agnostic DAS using pluggable analogue optical modules", IEEE Xplore Digital Library, Microwave Photonics, 2006. MWP '06. International Topical Meeting on, Oct. 2006, p. 1 of 1.
"Fiber Distributed Antenna Systems for Indoor and Outdoor-IONTM-Series", COMMSCOPE, Jan. 23, 2012.
-"T-Series tHostR Quad-Band Headend Unit", Dali Wireless Inc., 2013.
"T-Series t30TM. Quad-Band Low Power Remote Unit", Dali Wireless Inc., 2013.
"T-Series t43TM Dual-Band High Power Remote Unit", Dali Wireless Inc., 2013.
"NMS Network Management System", Dali Wireless Inc., 2013.
"CMS Capacity Management System", Dali Wireless Inc., 2013.
"Industry Applications Intelligent Solutions for Every Environment", Dali Wireless Inc., 2013, pp. 1-8.
"System Overview", Dali Wireless Inc., 2013, pp. 1-11.
The Dali Difference All Digital Smart RF RouterTM More Data Throughput with Less Equipment and Best Tool Cost of Ownership, Dali Wireless Inc., 2013, pp. 1-8.
"You're Heard, Loud and Clear. Installation and Operation Manual for the SBIII Digital Signal Booster Model 613-8", Bird Technologies Group, Manual Part No. 7-9485, Signal Booster III Digital Technology, pp. 1-28, Sep. 12, 2011.
Office Action dated Sep. 29, 2017, from the corresponding Canada Application No. 2,961,696.
Office Action dated Jan. 17, 2019, from U.S. Appl. No. 15/538,248, 71 sheets.

(56) References Cited

OTHER PUBLICATIONS

Canadian Office Action dated Jun. 27, 2019 for the Corresponding Canadian Patent Application No. 2,971,853.

* cited by examiner

ILLUSTRATION OF ANALOG TRANSFER FUNCTION OF EACH CELL RESOURCE

DIGITAL STREAM OF DATA, REPRESENTING THE CELL RESOURCES
OF SINGLE SECTOR. VECTOR Si(C1........Cn)

DIGITAL STREAM OF DATA IN WHICH EACH CELL HAS ITS OWN
HEADER AND CRC

AUTOMATIC MAPPING AND HANDLING PIM AND OTHER UPLINK INTERFERENCES IN DIGITAL DISTRIBUTED ANTENNA SYSTEMS

BACKGROUND

The worldwide in-building coverage market (IBW), or Distributed antenna system (DAS), as it is frequently called, has been constantly growing in the past few years. It is quickly becoming the major arena in which mobile operators' revenues are generated. Most of the calls and data transfers are now generated inside buildings and constitute around 80% of the operators' revenues.

In parallel to that, and due to the intensive use of smart phones, tablets, etc., data carrying capacity is quickly becoming a valuable and scarce resource. The demand for capacity has been constantly growing at a huge rate of around 100% per year. This means that a DAS system installed today will require twice the capacity a year from now and will require 8 times more capacity three years from now.

The aforesaid facts are valid not only for indoor DAS but also for outdoor DAS's particularly when serving multiple operators in confined areas such as campuses, stadiums, etc. DAS's which were focused in the past on providing coverage are now focused on providing capacity as well as coverage. One skilled in the art is well aware that the data throughput of the BTSs depends heavily on the signal to noise ratios in the uplink channels. The better the signal to noise ratio, the higher is the data throughput that can be handled by the BTS.

Therefore a critical step in installing and commissioning a DAS is ensuring that there are no uplink interferences and no excessive noise is present in the uplink channels of the DAS not just during the initial commissioning phase. Needless to say that during the life cycle of the DAS, the issue of uplink noise and interferences should be addressed on a regular basis.

There are quite a few sources that may generate uplink interference or excessive uplink noise in a DAS installation. Some of them are listed below:
  PIM (Passive Intermodulation products) generated at objects that are close to the DAS transmitting antenna and thus generate reflections back to the uplink channels of the DAS
  PIM generated at the DAS antenna
  PIM generated at the DAS connectors and cables. There are multiple antenna and cables connections in a DAS. Each connector which is not connected properly may cause PIM issues;
  PIM generated in the duplexers of the DAS RRUs;
  IMDs (intermodulation distortion) generated in the downlink MCPAs (Multi Carrier Power Amplifiers) of the DAS. RRUs in uplink frequencies, which may leak to the DAS uplink channels for example through the limited isolation of the cavity or ceramic duplexers or any other duplexers.
  Noise leakage from Downlink MCPAs to the uplink channels.
  Any external interference in the vicinity of the DAS antenna transmitting in the uplink frequencies which may penetrate the DAS uplink channels through the DAS antenna.

Therefore, as part of the DAS commissioning phase, DAS installers struggle to perform PIM and noise level field measurements in the uplink channels to ascertain that there are no PIM nor excessive noise nor interferences in the uplink channels. This is a very tedious, laborious, and costly task which has to be performed in the field as part of the commissioning process. What makes it especially cumbersome is when a real problem is found. The tasks of analyzing the problem in the field and trying to isolate the source of the problem in a DAS where there may be hundreds or even thousands of antenna and cable connectors is very laborious and very expensive.

SUMMARY

The present invention provides an algorithm that leverages the unique features and capabilities of the DCC-DAS (Digital Capacity Centric DAS) in order to perform automatic measurements of uplink noise, PIM, and any uplink interference as aforementioned Once an interference in the uplink is detected, this algorithm may automatically measure its parameters such as frequency, intensity, bandwidth, etc., and identify the source of the problem. It may automatically isolate and identify which element or cable of the DCC-DAS is the root cause of the problem or also which external source is generating the problem.

This algorithm may thus save a lot of laborious manual testing, debugging, and finding the root cause of a problem once such a problem is detected.

The first section of this patent application describes a concise description of a DCC-DAS compatible with the present invention, which was described in detail in PCT application PCT/US2013/054143, filed Aug. 8, 2013, the entire contents of which are incorporated herein in their entirety. The second section of this patent application describes the algorithm used for this automatic measurement and analysis.

BRIEF DESCRIPTION OF THE DRAWINGS

FIG. 9 a depicts a flowchart for noise level and interference measurements when downlink channels are on.

DETAILED DESCRIPTION

Figure 1:
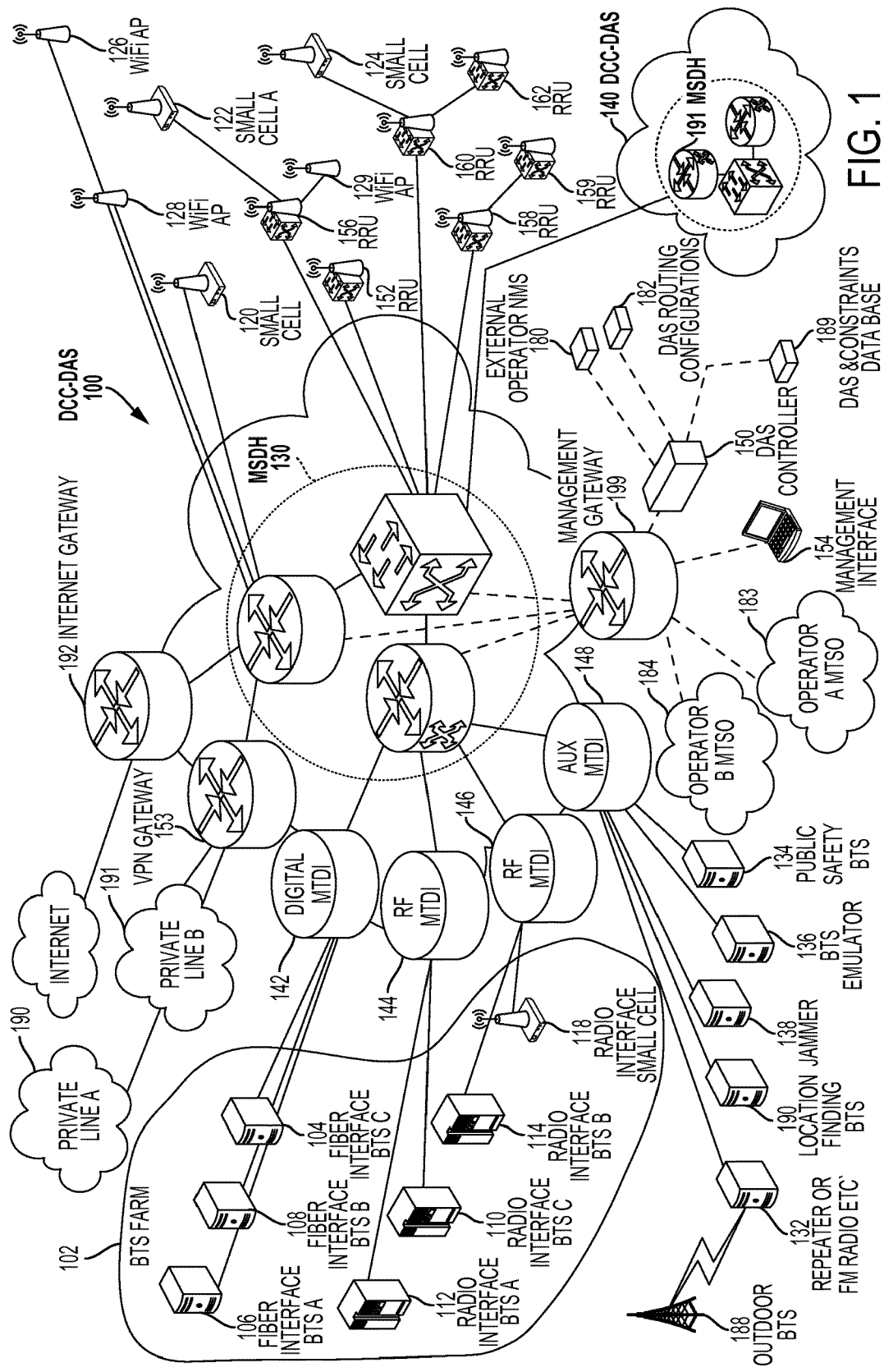
FIG. 1 depicts a block diagram of an embodiment of the DCC-DAS serving multiple sectors.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 depicts a function block diagram of DCC-DAS 100 according to an exemplary embodiment of the invention. DCC-DAS 100 integrates multiple resources of capacity, such as Cellular 2G/3G/4G resources, public safety resources, small cell, and broadband resources into one integrated operational system that is able to centrally manage its capacity resources and distribute them accordingly.

BTS farm 102 is the main resource of capacity of DCC-DAS 100. BTS farm 102 comprises various BTS's covering multiple technologies. Digital Fiber interface BTS's 104, 106, and 108 have digital baseband fiber interface (For example CPRI data) outputs whereas Radio Interface BTS's 110, 112, 114 and radio interface small cell 118 have Radio RF outputs.

Other capacity resources, like small cells 118, 120, 122, and 124 or Wi-Fi access points 126, 128 and 129 can be used by DCC-DAS 100 for offloading capacity purposes. They can be installed either in BTS farm 102, like small cell 118, or in remote zones, like small cells 120, 122, and 124 and WIFI access points 126, 128, and 129. MSDH 130 manages all the capacity resources of DCC-DAS 100. DCC-DAS 100 can be leveraged to manage auxiliary resources like off-air repeaters (Off air repeater receives the signal from remote BTS 188) or FM Radios 132, public safety BTS 134, and BTS emulator 136 for location finding purposes. DCC-DAS 100 can be used to direct the signal from jammer 138 to specific zones in which cellular calls are prohibited. As depicted in FIG. 1, DCC-DAS 100 is modular and can be connected to slave MSDH 191 and/or slave DCC-DAS 140 which covers other zones not serviced by DCC-DAS 100.

Each BTS in BTS farm 102 is connected to an MTDI. As shown, Digital fiber interfaced BTS's 104, 106, and 108 are connected to digital MTDI 142; RF BTS's 110 and 112 are connected to RF MTDI 144; and RF BTS 114 and Small Cell 118 are connected to RF MTDI 146. RF MTDIs 144 and 146 may passively combine the incoming RF signals from the various RF BTS's (110, 112, 114, and, 118) and adjust the level of the RF signals to the working level required by MTDI digital processor (320 in FIG. 3) which is part of each MTDI. Each MTDI can handle multiple BTS's. However if the number of BTS's in BTS farm 102 is greater than the maximum that can be handled by a single MTDI, then a number of additional MTDI's may be deployed as depicted in FIG. 1. Each BTS may also have MIMO links. The MIMO link connections and the way DCC-DAS 100 deals with MIMO links is shown separately in FIG. 15.

FIG. 1 depicts multiple RRUs 152, 156, 160, 162 which are connected to MSDH 130. Each RRU with its own antenna system covers a specific zone.

DCC-DAS 100 serves as IP backhaul for various devices such as Wi-Fi Access Points 128 and 129 or small cells 120 and 122. They can be directly connected to MSDH 130 like Wi-Fi access point (AP) 126 and Small cell 120 or through the RRUs like small cell 122 and Wi-Fi AP 129.

The IP backhaul data aforementioned is routed to MSDH 130 who splits the IP backhaul data from the digitized cellular data and sends the IP data to the Internet gateway 192 or VPN gateway 153 from which it is routed to the internet or to private lines 190 and 191, thus connecting those Wi-Fi APs or small cells with the external world or the operators network.

DAS controller 150 manages and controls the DCC-DAS 100. DAS controller 140 stores the various configurations of the DAS and various parameters such as routing configurations 182 (which is part of DAS controller 150) and Infrastructure constraints database 189 which is also part of DAS controller 150. DAS controller 150 interfaces with MSDH 130 through management gateway 199. The human machine interface 154 which enables the DAS operator to control and manage the system is also interfaced with the MSDH 130 through management gateway 199. DAS controller 150 is able to connect to an external operator NMS (Network Management System), send alarm data, or accept control data from the NMS. This NMS can be a conventional NMS or part of a Cloud computing network that supports multiple BTSs. The management gateway 199 can directly interface with the operators' mobile telephone switching office (MTSO) 183, 184 for various control and management functions which will be explained later or it can interface with the operator cloud computing network.

Figure 2A:
FIG. 2A depicts a representation of the filtering of cell resources.

In the downlink direction, each MTDI converts each incoming RF signal to an IF signal and then digitizes the IF signals and passes them through a digital filter bank. The MTDI may filter each incoming signal using a specific digital filter matched to the technology and the bandwidth of each BTS cell resource as shown in FIG. 2A. A cell resource is defined as a contiguous piece of spectrum that the operator of the DCC-DAS wishes to distribute, for example, consisting of one or more wireless signals of the same wireless cellular technology type. However, this is just an example. A cell resource can also be any contiguous piece of spectrum in the frequency bands of the DCC-DAS that the operator wishes to digitize and distribute via the DCC-DAS RRUs. FIG. 2A shows as an example the cell resources in the US PCS frequency band. A1 and A2 are Verizon™ cell resources in the PCS band; B1, B2, and B3 are AT&T™ cell resources in the PCS band; and C1, C2, and C3 are Sprint™ cell resources in the PCS band. The MTDI then converts the digital filtered signals to a digital stream of data samples (e.g. I/Q data samples) which are routed to MSDH 130. FIG. 2A depicts also the digital filters that are assigned to each cell resource.

Figure 2B:
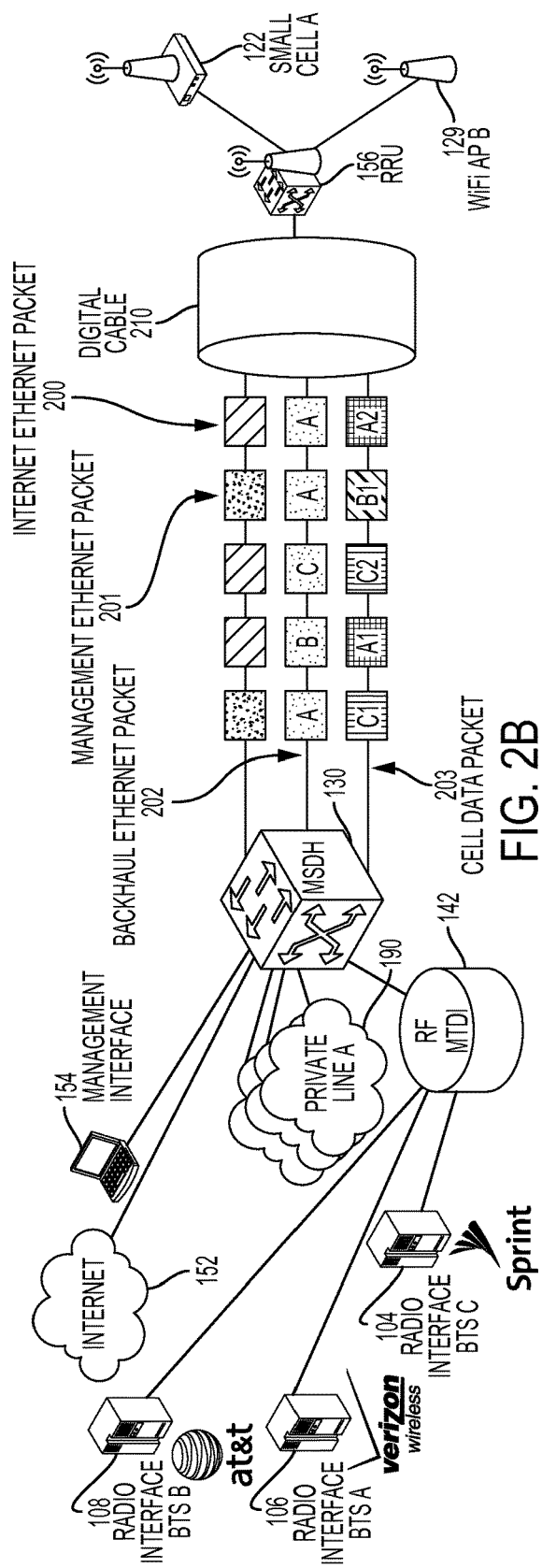
FIG. 2B depicts an illustration of how digitized cell resources are generated and sent across a CPRI link.

FIG. 2B shows a conceptual representation of the data flow in the digital link 210 between the MSDH 130 and the RRU 156. It clearly shows the cell resource data (203), C1, A1, C2, B1, A2 which are components of the digital links between the two modules. It also shows the Ethernet backhaul data packets 205 for the small Cell 122 and Wi-Fi AP 129 marked as A B C A etc., as well as Ethernet packets (201) for management and internet (200) purposes.

Figure 2C:
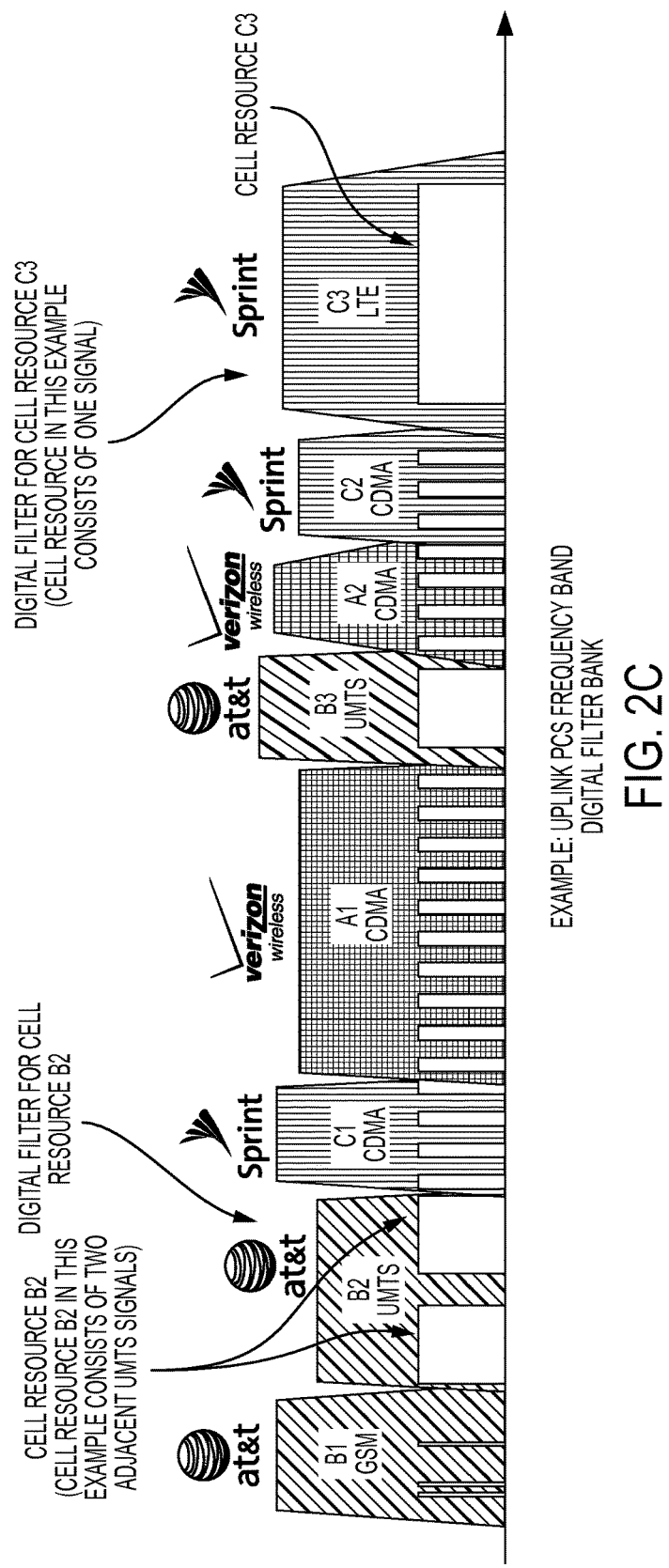
FIG. 2C depicts an illustration of how digitized cell resources are transmitted between the MTDI and BTS.

In the uplink direction, each MTDI performs the reverse operation. The MTDI receives a digital stream of data samples representing the cellular uplink channels coming from the Remote Radio Units (RRUs) through MSDH 130. It combines signals destined for the same BTS input and converts them to uplink signals that are sent to the various BTS's. In the uplink each MTDI may have the same structure of cell resources and digital filters associated with them which is a mirror image of the Downlink cell resources and digital filters just shifted in frequency to the uplink channels of each BTS All this as depicted in FIG. 2C.

There are, for example, three functionally different MTDI modules: digital MTDIs that connect to BTS's through a digital interface such as digital fiber; RF MTDIs that interface using analogue RF signals with RF BTS's; and auxiliary BTS's that interface with auxiliary equipment. But the structure of cell resources and digital filters associated with them prevails in all the three MTDI modules.

MSDH 130 is the central hub of DCC-DAS 100. MSDH 130 receives the digital streams of cell resource data from the MTDI's and routes them to the various RRUs as directed by DAS controller 150. In the uplink direction, MSDH 130 performs the reverse operation. MSDH 130 receives data from the RRUs and directs it to the relevant MTDI which is then sent to the relevant BTS. Where the same cell resource is allocated to more than one RRU, the uplink signals from the RRUs are summed together in order to create a single combined uplink signal for that cell resource which is then sent to the MTDI.

As aforementioned, the MSDH 130 also handles Ethernet data which is used as the IP backhaul of the small cells (120, 122, and 124) and Wi-Fi APs (126, 128, and 129) and routes the data to Internet gateway 192 or VPN gateway 153.

Each RRU 156, 158, 160, and 162 is basically a multiple band, multiple technology digital repeater which receives a digital stream of cell resource data (digitized signals) from the MSDH 130, converts the data from IF signals to RF signals, and transmits the RF signals to one or more zones in the downlink direction. A zone is a geographical area covered by a single RRU output. Since an RRU may be connected to one or more antennas, a zone may be the area covered by one or more antennas which are all connected to the RRU. In the uplink direction, the RRU performs the reverse operation. The RRU receives RF signals, converts them to IF signals, digitizes the IF signal, passes the digitized IF signal through a digital filter bank consisting of the array of uplink cell resources and digital filters associated with them, and sends the resulting signal to MSDH 130.

DCC-DAS controller 150, together with the database routing module 182 and control and management interface 154, store and control the various configurations of DCC-DAS 100. Data base 189 may also store all the cell resources measurements as well as interferences measurements performed in each digital filter (FIGS. 2C and 2A) during the commissioning of the DCC-DAS.

Figure 3:
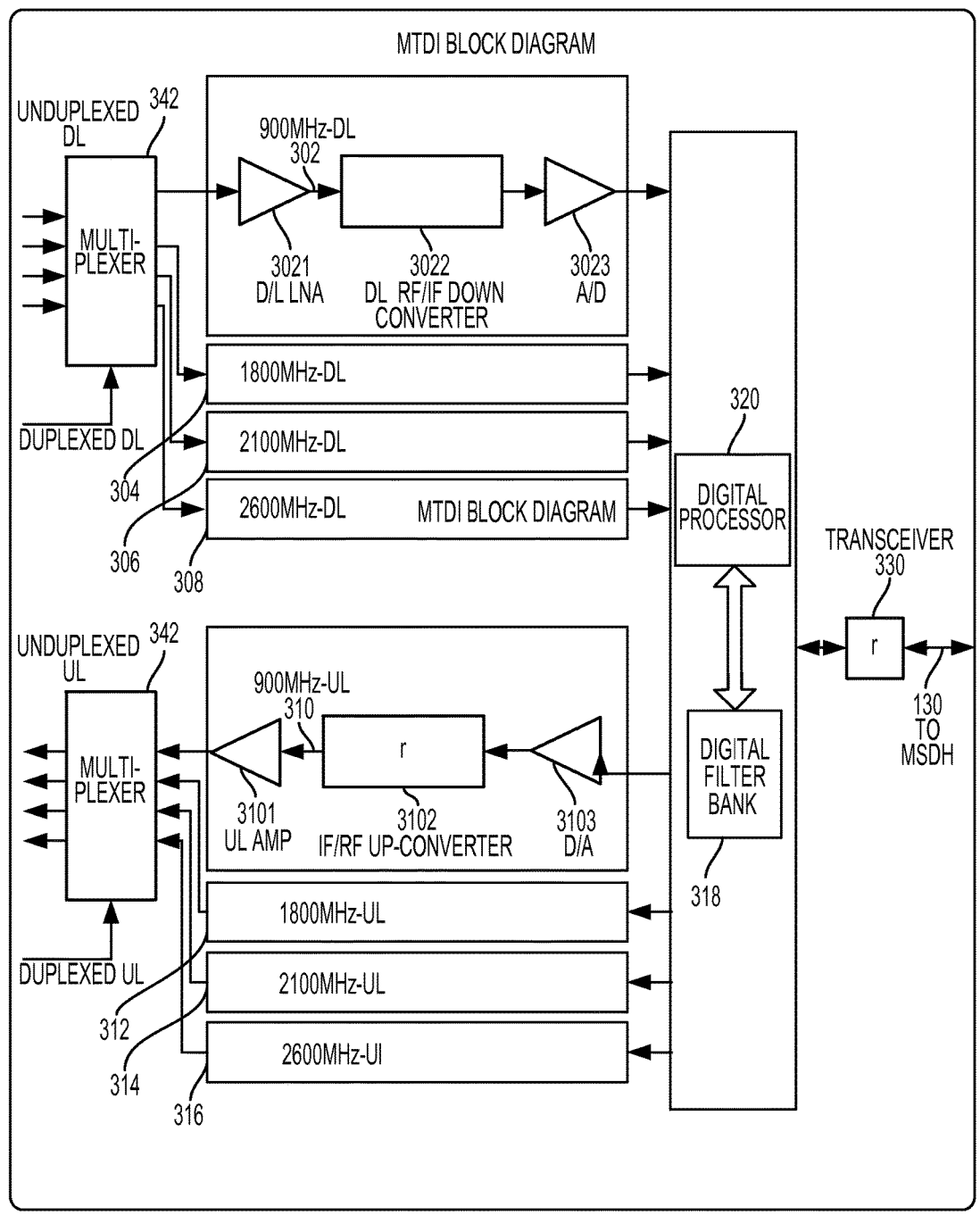
FIG. 3 depicts a block diagram of a MTDI.

FIG. 3 depicts an exemplary MTDI 300 designed to cover all the European spectrum consisting of four frequency bands, namely 900/1800/2100/2600 MHZ. As shown in FIG. 3, MTDI 300 comprises four downlink (DL) modules 302, 304, 306, and 308 (one module for each frequency band) and four uplink (UL) modules 310, 312, 314, and 316. Each DL module (consisting of LNA 3021, RF to IF Down conversion module 3022, and A/D converter 3023) converts the whole frequency band (e.g., the whole 900 MHz European band covering 35 MHz, the whole DCS band covering 75 MHz, or the whole US PCS band covering 65 MHz) into IF and then digitizes all the incoming signals in this band. As an example, downlink module 306 converts all the UMTS band to IF and digitizes it. The digitized data coming from the four DL modules enters a digital processor 320 comprising the digital filter bank 318 which allocates a digital filter to each cell resource. Such a digital filter bank together with the associated digital filters of the PCS band for example is depicted in FIG. 2A for the downlink path and 2C for the uplink path. Thus, each cell resource has its own digital filter. Digital filter bank 318 may consist for example of 16 different filters. However, any number of different filters may be utilized. A digital filter is defined as a selective function that is intended to pass signals for one cell resource as previously defined. Each digital filter may have its own separate and distinct transfer function consisting of a specific filter mask as required for example by the specific technology standards, specific bandwidth, slopes, gain etc. The digital filters may all be implemented by a single digital filter bank 318 or may be distributed across a number of different processing modules. The digital filters in digital filter bank 318 may be operable in both the uplink and downlink directions. The digitized RF data contained in each digital filter (in each RRU or each MTDI) which consists of digital downlink or uplink cell resources+noise+any interference may be monitored and stored in the DCC-DAS data base (FIGS. 1-189) through any operational or commissioning phase of the system.

The MTDI Digital processor 320 is programmed to convert the output of the digital filter bank 318 into a serial stream of digitized Cell Resource I/Q data (each such cell resource I/Q data is a digital baseband representation of the RF signal in the digital filter covering the frequency band of one cell resource. In other words, each such cell resource I/Q data is the digitized representation of the RF signal of a specific cell resource (which would typically be a baseband representation) which is obtained from the output of digital filter bank 318 and sent to MSDH 130 through transceiver 330. In the uplink the reverse operation is performed by the uplink modules 310, 312, 314, 316, each one consisting of 3101, 3102, 3103.

Figure 4:
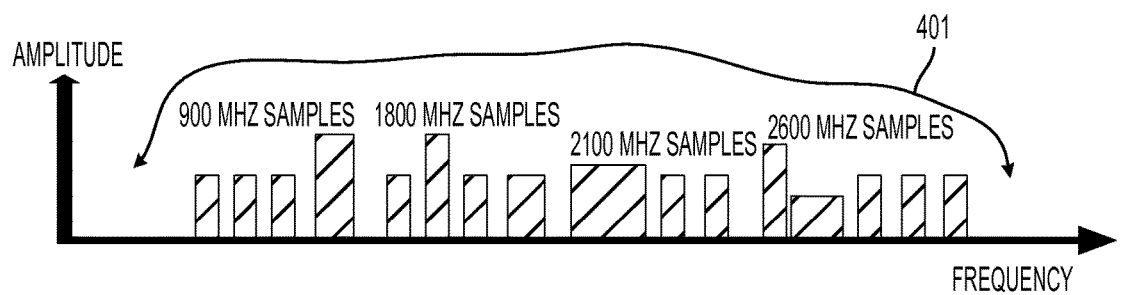
FIG. 4 depicts a sample analog representation of a serial data packet sent from the MTDI to the MSDH.

FIG. 4 depicts an analog representation 401 of the stream of serial Cell resource data which is the output of digital filter bank 318. The output of digital filter bank 318 constitutes all the cell resources of the BTS farm 102 in one sector. A sector cellular resource vector is defined as $$Si(C1 \ldots Cn)$$

where Si is the sector no. i and C1 ... Cn are the cellular resources (cell resources) 1 to n allocated to that specific sector. The analog representation in FIG. 4 demonstrates a case where n=16, and there are 4 bands and 4 cell resources per band and that each cell resource which is an analog representation of the output of a digital filter may have its own separate and distinct transfer function.

Figure 5A:
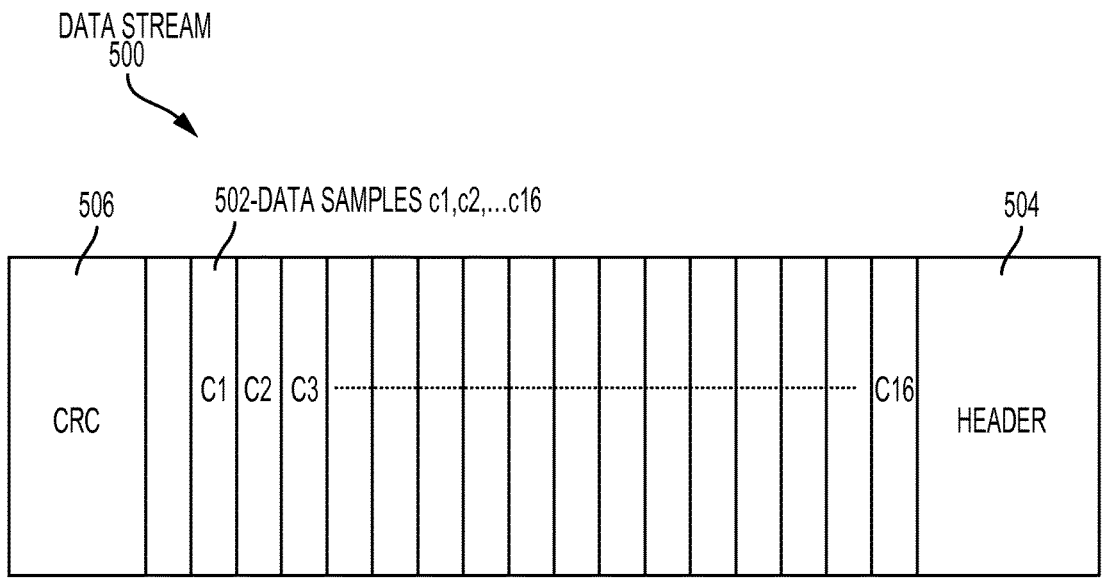
FIG. 5A depicts a stream of data representing the cell resources of a single sector.

Zone sector Allocation—FIG. 5A depicts a stream of data 500 comprising sixteen baseband cell resource data samples 502 C1 ... C16 with header 504 and Cyclic Redundancy Check (CRC) 506. Header 504 and CRC 506 identify data stream 500 formed by one sampling of all the 16 filters in all the frequency bands and constitutes all the capacity resources of one sector assigned to one MTDI. In this case the whole vector S(C1 ... C16) which comprises all the cell resources of one sector will be allocated as one unit to a number of zones. This is called Zone sector allocation.

Figure 5B:
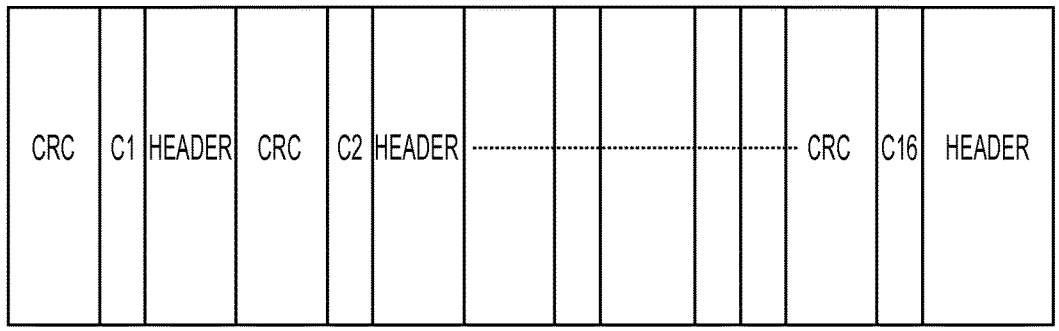
FIG. 5B depicts a stream of data in which each cell has its own header and CRC.

Cell Resource Allocation—FIG. 5B depicts an alternative architecture for forming data packets in which data samples 502 are individually encapsulated by a header 504 and a CRC 506. This architecture enables also to independently identify each digitized Cell Resource I/Q data which is the output of each filter in filter bank 318. In this mode of operation, each cell resource is an independent unit and can be routed separately to different zones in the building. Instead of routing complete sectors, MSDH 130 now routes individual cell resources to the various zones. Thus, each cell resource data which is the output of each digital filter in digital filter bank 318 can now be routed to different zones. Additionally, the gain and power level of each cell resource can be individually adjusted. This mode may also be referred to as zone cell resource allocation, compared to zone sector allocation depicted in FIG. 5A.

The aforementioned data format is only an example. Header 504 may be omitted if the identity of data samples 502 can be identified by some other means (e.g. implicitly due to prior negotiation over a management interface or due to some overall frame structure) and CRC 506 may be omitted in the case that error detection is performed by some other means or is not of interest.

It should be obvious to one skilled in the art that the sixteen filters in digital filter bank 318 or the four European frequency bands or the number of BTS's are just an example. All these parameters can vary based on the needs of the system designer. The size of digital filter bank 318 depends on the processing capacity of the MTDI and a more powerful processor will enable a bigger filter bank covering more filters and more cell resources.

The above described process is an efficient way to multiplex multiple outputs of many BTS's and various technologies into one serial stream of digital Cell resource I/Q data samples using one module and one processor with one digital filter bank where each data sample represents one cell resource and where the signal carried by that stream of data samples is processed according to its own specific transfer function. The group of data samples coming from one filter bank typically constitutes all the cell resources of one sector. The digital stream of Cell Resource I/Q data samples can use OBSAI/CPRI protocol or may use any other specific protocol chosen by the designer. In the example shown in FIG. 3, MTDI 300 consisting of one digital filter bank 318 can cover all the 4 European cellular bands (GSM 900, DCS 1800, UMTS 2100 and LTE 2600) and can integrate 16 BTS's, each one having its own cell resource. Further, MTDI 300 can cover various cell resources in one band each one having different technology or same technology with different transfer function (frequency response).

An alternative implementation, which is functionally equivalent, is to implement filter bank 318 and the division of the signals into cell resource I/Q data samples on the MSDH 130. In this case, MTDI 300 would transmit a digitized representation of the whole of each frequency band to be divided into cell resource I/Q data samples internally within MSDH 130. MTDI 300 functionality described here would, in such a case, be distributed between MTDI 300 and MSDH 130. If the MTDI is to perform cell resource and noise and interference measurements in this case it would be done for the whole frequency band (like UMTS 2100 MHZ or PCS 1900 MHZ for example) and cover multiple RF cell resources and multiple interferences.

The use of digital filter bank 318 allows the amount of data flowing through DCC-DAS 100 to be reduced, thus enabling more capacity in the cables. This is due to the fact that only the output of digital filter bank 318 (or just the cell resources data) is converted to serial data and not the whole spectral bandwidth of each specific band. The saving in the data quantity becomes significant, particularly when only one or two operators are involved and their assigned frequencies are just part of the whole spectral width of the frequency band. Formatting of the digital data for transmission through DCC-DAS 100 may also include an additional compression stage to even further reduce the data flowing in the CPRI links.

In the near future, the European and America cellular operators will be deploying new technologies in legacy bands. For example, the 900 MHZ GSM band in Europe is being reallocated to allow multiple technologies in this band so that now it becomes 900 MHZ covering GSM/LTE/WCDMA. The same is happening to other bands worldwide. The DCC-DAS architecture enables the user to easily reallocate or re-farm the spectrum in each band according to the various technologies deployed in this band. All he has to do is reconfigure the filter bank and select specific digital filter characteristics with specific transfer functions desired for each digital filter to accommodate to the new technologies cell resources. Such reconfiguration can be done via management interface 154 which may be accessed locally or from a remote location though the internet or off-air through RF modems.

Further, it is easy to add additional BTS's to BTS farm 102. All a user must do is connect the new BTS to the system and allocate specific filters in digital filter bank 318 to the new cell resources associated with the new BTS. If the BTS contains two or more technologies or non-contiguous cell resources, then two or more digital filters should be allocated in the digital filter bank, with each one of the digital filters allocated to one cell resource In the uplink direction, MTDI 300 performs the reverse operation. MTDI 300 receives the stream of data packets coming from the various RRUs through MSDH 130 and distributes them throughout BTS farm 102. The RRU's have their own digital filter bank accordingly.

Each MTDI 300 may serve one sector and the output of MTDI 300 will be routed by MSDH 130 to one or more zones. If additional zones need to be covered, or more capacity is required in a geographical region, then a new sector may be used to cover the additional zones in the building, or to provide more capacity to existing zones by dividing the area covered by DCC-DAS into new zones, each one covered by a dedicated sector. In this case, a second MTDI (MTDI 146 in FIG. 1) may be connected to an additional BTS 114, and small cell 118 for example. The output of the second MTDI 146 will be connected to MSDH 130. This second MTDI output will be another cell resource vector consisting of all the cell resources in the second sector. DCC-DAS 100 can now support up to n different sectors. Each sector will be routed to one or more zones in the area covered by DCC-DAS 100.

Figure 6:
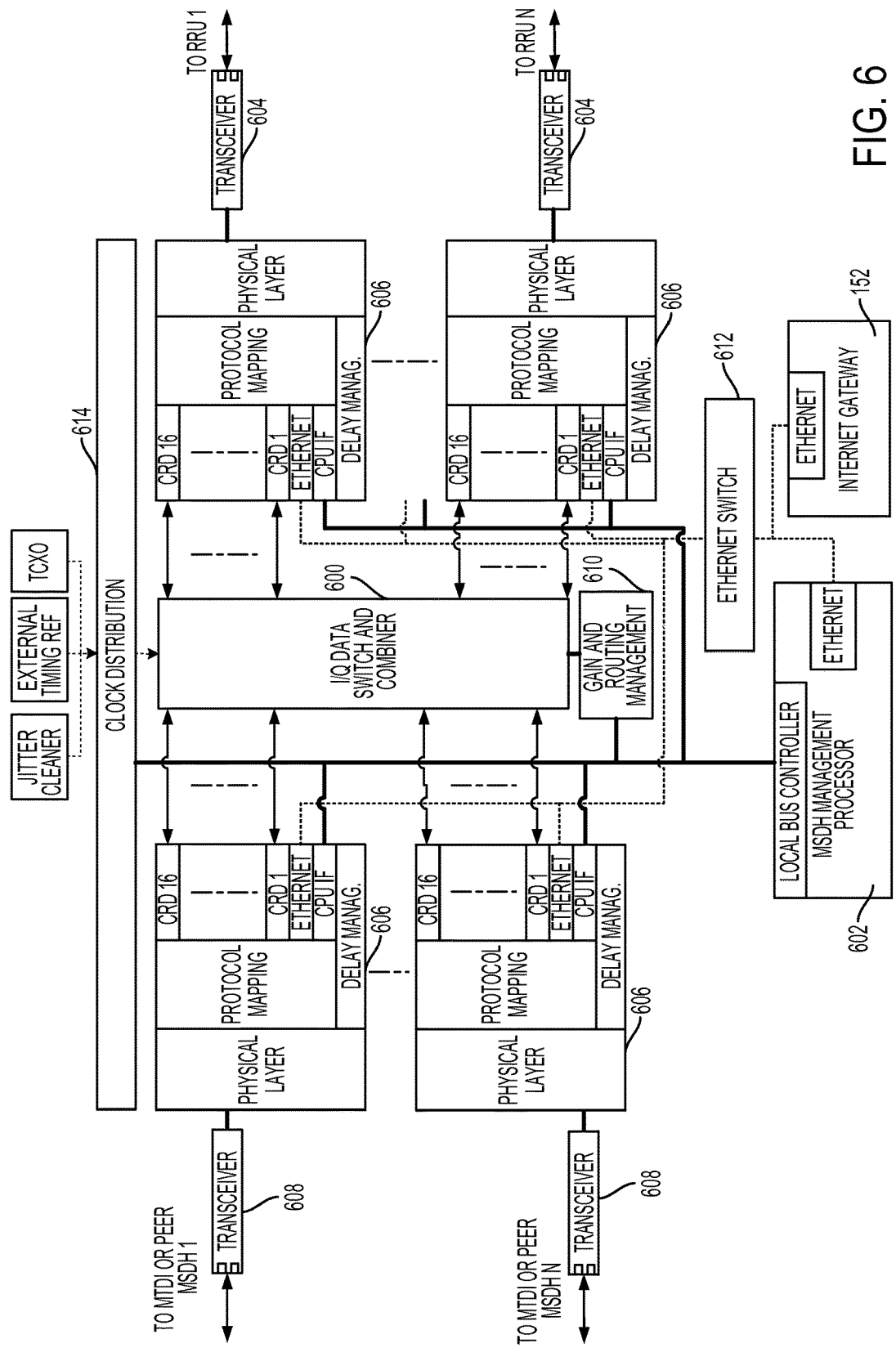
FIG. 6 depicts a block diagram of an MSDH.

FIG. 6, depicts a block diagram of MSDH 130. MSDH 130 is the central hub of the DCC-DAS 100. MSDH 130 connects to all the elements of DCC-DAS 100 like the RRU's (156, 158, 160, and 162); BTS farm 102 through MTDIs 142, 144, 146, and 148; Wi-Fi access points 126, 128, and 129; small cells 118, 120, 122, and 124; and slave DCC-DAS 140 for cascading purposes.

The main function of MSDH 130 is to distribute and route the downlink signals coming from the MTDI(s) to the various RRUs as directed by the DCC-DAS Controller 150 and perform the reverse operation to combine the uplink signals. All this is done based on the distribution matrix programmed into the I/Q data switch and combiner 600 FIG. 6 which is dynamically controlled by management processor 602.

MSDH 130 connects through various plug-in transceivers 604 to the RRUs which are located at various zones in the area covered by DCC-DAS 100, and through plug-in transceivers 608 to the MTDIs, and optionally slave MSDHs in case the DCC-DAS 100 is extended with multiple MSDHs. The exact number, configuration, and capacity depend on the building or campus size which is being served by DCC-DAS 100. Plug-in transceivers 608 and 604 transfer cell resource data samples from the MTDIs or slave MSDHs to and from the relevant RRUs based on the MSDH distribution matrix in I/Q data switch and combiner 600. The communication can be based on any suitable digital protocol, such as CPRI/OBSAI serial protocols or any other serial data protocol. MSDH 130 also embeds an Ethernet layer with the serial data stream of digitized cell resource data samples in order to transmit control data and serve as the IP backhaul of the offload devices such as small cells, Wi-Fi access points, or any other offload device. The various offload devices may be connected to the RRUs (e.g., Wi-Fi AP 129 is connected to RRU 156 by Ethernet connection in FIG. 1) and from there through the RRU CPRI link to the MSDH 130 or directly to the Ethernet switch 612 associated with the MSDH (e.g., Wi-Fi AP 128 in FIG. 1).

Data link blocks 606 in FIG. 6 are responsible for formatting the data transmitted over the digital links. In the example, interfaces are provided for data streams of 16 downlink cell resource data samples (CRD 1 . . . CRD 16) and the corresponding 16 uplink cell resource data samples. In addition, data link block 606 provides an interface for Ethernet data packets that serves as the IP backhaul for the offload devices, and a CPU interface (CPU IF) for control and management of the data link. These data elements are then formatted according to the protocol mapping layer for transmission/reception over the physical layer. The data link blocks 606 incorporate a delay management function which allows the round-trip delay across each interconnection to be measured. This can be used to equalize delays through the DCC-DAS 100.

MSDH 130 connects through one or more transceivers 608 in FIG. 6 to the various MTDIs and slave MSDHs. Typically, one transceiver 608 connects to each MTDI or slave MSDH; several transceivers may be used in parallel if the total data bandwidth exceeds the capacity of a single transceiver. The I/Q data switch and combiner 600 is enabled to combine (sum together) uplink cell resource data samples destined to a transceiver 608. This function is not necessary for transceiver 604 which connects to an RRU; omitting the function simplifies the design of I/Q data switch and combiner 600. The transceiver 604 therefore only requires a sub-set of the functionality of transceiver 608. A different implementation of the MSDH could allow combining of samples at all outputs, in which case any transceiver could function either as a transceiver 608 and 604 as required. Also, an operator may choose to use a transceiver that is capable as operating as a transceiver 608 as a transceiver 604 to increase the number of supported RRUs.

The Ethernet layer for each connection is combined by an Ethernet switch 612, which may be integrated within the MSDH 130 or may be a stand-alone device external to MSDH 130. From there, the Ethernet data is connected to auxiliary equipment such as internet gateway 192, DCC-DAS controller 150, management interface 154, etc. as shown in FIG. 1.

MSDH management processor 602 is responsible for maintaining the operating state of the MSDH 130 through the local bus controller. It is connected to the Ethernet switch 612 which enables remote access from the internet gateway 192. It may also communicate with peer devices (MTDIs, RRUs or MSDHs) as part of establishing and updating the connections through data link blocks 606. This communication may take place via Ethernet switch 612, or may involve some lower level communication directly via data link blocks 606.

Gain and routing management function 610 is responsible for updating the MSDH distribution matrix implemented by I/Q data switch and combiner 600 under control of the MSDH management processor 602.

Clock distribution function 614 provides the reference clock used through the MSDH 130. An MSDH can be the master of the system timing, or it can be a slave to a peer MSDH. In the event that it is master of the system timing, it generates its own internal reference clock using an in-built oscillator such as a TCXO, or it may receive an external reference clock from the external timing reference connection. In the event that the MSDH is slave to another MSDH it receives its timing reference via the corresponding transceiver 608. This timing reference is fed to the jitter cleaner to generate the internal timing reference used for all other transceivers 604 or 608. This clock distribution system ensures that transfer is synchronous across all data links, and avoids the need for resampling/retiming where data is interchanged between devices.

MSDH 130 connects through one or more transceivers 608 to auxiliary MTDI 148 (FIG. 1) which interfaces with auxiliary equipment such as repeaters or FM radio 132, jammer 138, public safety BTS 134, and location finding BTS 190.

MSDH 130 connects to slave MSDH 191—FIG. 1—through one of the transceivers 608, thus enabling a modular growth of the system. Several slave MSDH's which control additional multiple RRUs can be cascaded using this methodology, enabling the system to cover huge campuses and residential areas. Thus, this architecture enables modular growth by cascading MSDH elements, each one of them serving multiple remote RRUs.

Returning now to FIG. 6, one can see how Ethernet data is switched from transceiver 604, through Ethernet switch 612 to internet gateway 192. The backhaul IP data is in this way transmitted directly to the internet instead of to the MTDI like in the case of the cell resource data samples.

Figure 7:
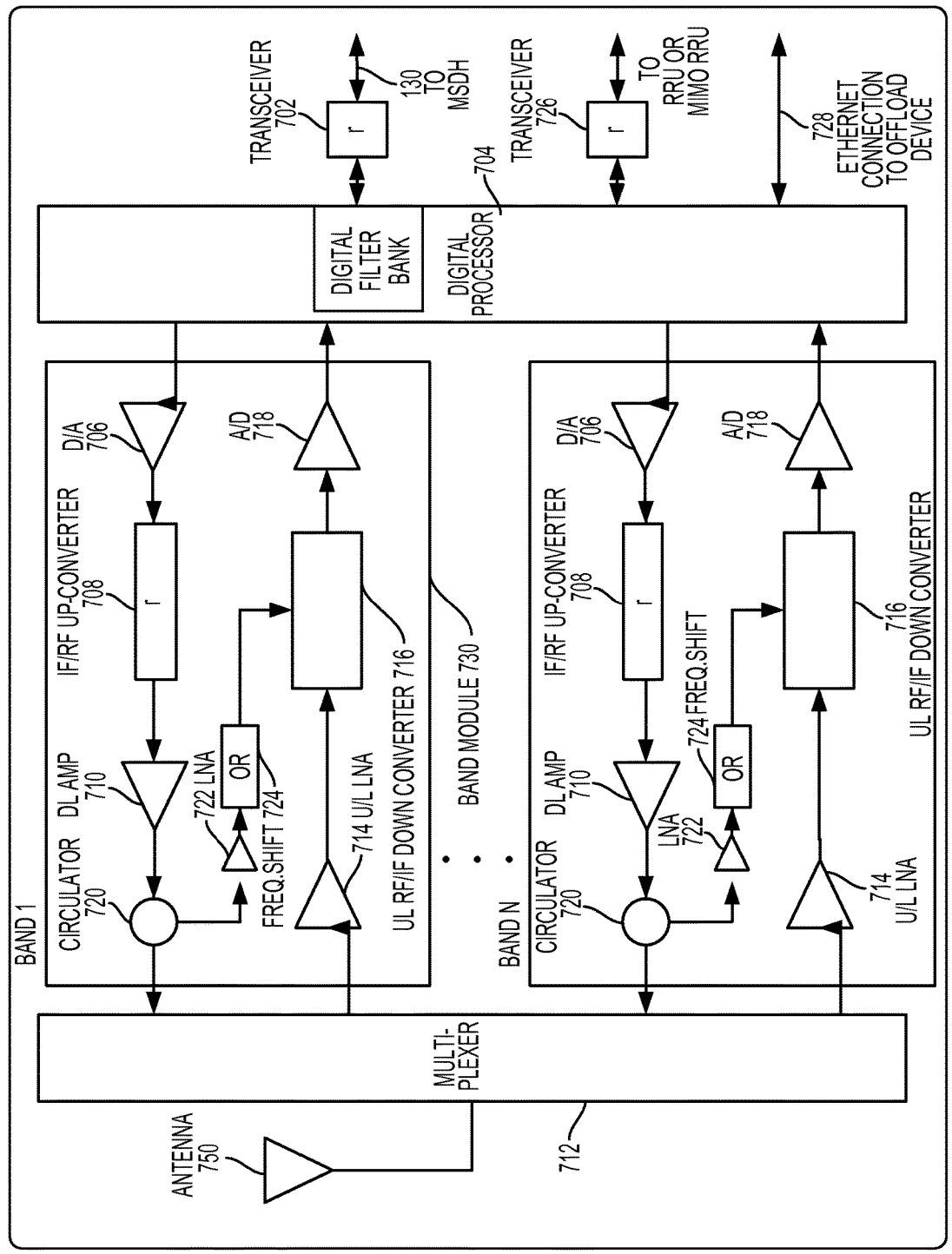
FIG. 7 depicts a block diagram of an RRU.

Remote Radio Units 152, 156, 158, 159, 160, and 162 are the transmitting and receiving front ends of the system. Each RRU is a multiband digital repeater which can be designed to cover all wireless or cellular technologies of interest (US or European or any other). FIG. 7 depicts a block diagram of an exemplary RRU 700. In the downlink path, transceiver 702 receives the serial stream of cell resource data samples from MSDH 130 (CRD1 . . . CRD16 in 606 FIG. 6). RRU 700 then processes and passes the signal through the digital processor 704. Digital processor 704 has a similar, though not necessarily identical, digital filter bank to MTDI 300, but in the uplink path. This digital filter bank in the RRU contains one or more relevant digital filters corresponding to the cell resources which are allocated to the RRU 700. Digital processor 704 reconstructs the composite signal for each output frequency band from the cell resource data samples, and outputs each signal to the corresponding band module 730. D/A converter 706 in each band module 730 converts the outputs of the filter bank relevant to this band to an analog IF signal which is then up-converted to RF frequency by converter 708. Downlink amplifier 710 amplifies the signal and sends it to multiplexer 712. Multiplexer 712 combines all the N relevant bands into the required number of RF output signals.

The output of multiplexer 712 is connected to one or more outputs covering one zone. The output may be split into one or more antennas, each one covering a sub-zone which may consist of one room or one floor or group of floors in the building (or relevant users areas in an outdoor environment). In the uplink path multiplexer 712 receives all the mobile cell-phone signals and splits them to all the relevant N bands. For each band, a low noise amplified (LNA) 714 provides low noise amplification. The amplified signal is then down converted to IF by down converter 716 and then converted from analog to digital by A/D converter 718. Digital processor 704 combines all the signals from all the bands and passes the uplink digital signals through a digital filter bank consisting of the array of uplink digital filters associated with all the uplink cell resources The cell resource s signals are then converted to serial uplink cell resource data samples and sent through the transceiver 702 to MSDH 130. As in the case of the MTDI, it is possible to partition the system such that the filter bank is implemented on MSDH 130 while maintaining the same functionality.

RRU 700 additionally contains a sniffer receiver circuit in each band module 130 which comprises circulator 720, LNA 722, and frequency shift module 724. The purpose of the sniffer receiver is to measure all the downlink signals coming from the adjacent RRUs and the macro network in order to measure the isolation between the various RRUs and the level of penetration of the macro network into the building, or to be more precise into the zone covered by the one or more antennas connected to each RRU 700. The process of measuring the isolation between the various RRUs is done by shutting down or disconnecting the output of DL amplifier 710 only in the measuring RRU from the multiplexer 712 and disconnecting the output of LNA 714 in the UL path from down converter 716, and connecting UL RF/IF down converter 716 to Freq. shift 724 of the measuring RRU. The receiving path of the measuring RRU consists now of multiplexer 712, circulator 720, LNA 722, Frequency shifter 724 and down converter 716. This measuring RRU is practically acting now as a sniffer receiver. The rest of the relevant RRUs in the DAS are transmitting test signals simultaneously (or in succession) in all the cell resources frequency allocations, or alternatively are transmitting normal DL traffic and logging the power level etc. of the transmitted signals. These test signals are then received in the downlink path of the specific measuring RRU 700 who is in a sniffing receiving mode through the aforesaid sniffer receiver circuit which comprises circulator 720, LNA 722, and frequency shift module 724 and RF/IF down converter. The downlink test signals, which are received by multiplexer 712 are diverted by circulator 720 to LNA 722 and amplified by LNA 722, are now converted by frequency shift module 724 to the relevant up link frequencies and are now processed by the uplink path as if they were uplink signals. One should remember that these signals are an image of the original downlink signals penetrating this RRU which are shifted by a certain constant to the uplink channels. For example, the downlink signals in the US cellular band are shifted by 45 MHZ from downlink to uplink signals. The shifted signal is then processed by the uplink channels. The level of the test signal is measured and sent to MSDH 130 for processing. Based on the received signal levels in each cell resource filter in the filter bank located in digital processor 704 and the level of the test signals (either generated test signals or logged downlink traffic), MSDH 130 can calculate the isolation between each RRU and the specific measuring RRU and also the level of penetration of the macro network to that specific measuring RRU zone.

Different implementations of the sniffer receiver circuit can be considered, which achieve the same outcome while providing various trade-offs. For example, the LNA 722 may be omitted at the expense of reduced sensitivity. The frequency shift function may be omitted in case the downlink frequency band lies within the tunable range of uplink RF/IF down converter 716.

As aforesaid, the sniffer receiver circuit may be used to measure the penetration of the macro network into the building. In this process, all the DCC-DAS's RRUs downlink and uplink channels are muted or disconnected as aforementioned and all the RRU's are now receiving signals through the sniffers receiver which consist of elements 712, 720, 722, 724, 716, 718, and 704. Thus, the RRU sniffer receiver may receive now only the external macro network signals which may penetrate the building. By measuring the signal strength in each filter of the uplink digital filter bank in digital processor 704, the system may measure the macro network signals in each of the cell resources frequencies (c1 . . . cn). A vector MSj (C1 . . . Cn) may now be generated. DCC-DAS controller 150 may now know how much interference the macro network causes to DCC-DAS 100 and also one skilled in the art knows that this is related to the level of interference DCC-DAS 100 may be causing to the macro-network by signals leaking from the building. All this information is critical to the performance of DCC-DAS 100 and the Macro-network as well. DCC-DAS 100 is thus capable of calculating this information without the use of external test equipment and costly manpower.

RRU 700 may comprise one or more transceiver ports 726 which connect RRU 700 to a slave RRU. The slave RRU can be used for extending the coverage of RRU 700 to additional zones (i.e. floors for example); to add more bands or technologies to the master RRU; or to provide MIMO capabilities to the bands in RRU 700. Typical interfaces, such as OBSAI/CPRI over a fiber-optic connection, may be used to connect to the slave RRU. This configuration allows for connecting multiple RRUs in cascade all being connected through one transceiver 702 and one cable to MSDH 130.

Additional Ethernet port 728 may also connect to an offload device such as Wi-Fi Access Point 129 or Small Cell 124 (see FIG. 1). In this case, Ethernet port 728 serves as the IP Backhaul link for the offload devices. The backhaul data is connected through Ethernet port 728 to digital processor 704 and from there through transceiver 702 to MSDH 130. The MSDH 130 splits the cell resource data from the IP backhaul data or other Ethernet-carried data as aforementioned. This method enables a quick and easy integration of DCC-DAS 100 with any device that requires IP backhaul infrastructure.

The communication from MSDH 130 to other DCC-DAS 100 modules in most cases may be based on fiber optic cables (Single Mode and/or Multi Mode Fiber) and associated transceivers in order to enable high capacity traffic. However, DCC-DAS 100 may use any cable that exists in the building such as CAT5 cables, copper cables, Ethernet cables, TV cables, coaxial cables, etc. In order achieve this flexibility, the transceivers may not be an integral part of the MSDH, RRU, or even the MTDI. They can rather be plug-in modules that can be selected based on the specific installation needs.

All a user has to do is choose the right plug-in transceiver that fits the cable and the capacity enabled by that specific cable which was selected. The user must then connect it to the cable and plug it into MSDH 130. If the installation is changed and new cables are installed then the plug in transceivers can be replaced accordingly.

DCC-DAS management processor 602 (FIG. 6) is programmed to read (from the system configuration or the transceivers themselves) the maximum capacity that each transceiver/cable can handle and will not allocate any capacity which is higher than the maximum supported by that specific transceiver and the associated cable.

The algorithm for mapping and handling PIM and other uplink interferences consists of three phases. The first phase maps interferences when no downlink channel is active. The second and third phases map the PIM and other uplink interferences which may be caused by the active downlink channel.

Phase A—Measuring and Mapping any Excessive Noise and Interference in the Uplink Channels when all the DAS Downlink Channels are Shut Off or Muted The purpose of phase A is to measure the excessive noise and interferences that may be generated in the Uplink channels of the DCC-DAS due to external sources or wrong calibration of the uplink channels and identify any calibration or interference issue. By excessive noise, we mean any noise level that is higher than the noise levels which are designed to be in the various DCC-DAS uplink channels in the design phase. The mapping is performed on one or more of the cell resources, on one or more of the RRUs, and may be performed in one or more test points between the antenna and the interface to the BTSs along the uplink receive path. The MTDI test as described below serves as such an example.

Phase B—Measuring and Mapping any Excessive Noise and Interference in the Uplink Channels when all the DAS Downlink Channels are Active Phase B is performed by activating one or more BTSs in zero traffic mode (no uplink calls) in full transmission power (or activate one more synthesizers which may simulate downlink transmission) with no uplink activity, and measure and map any excessive noise or interference in the uplink cell resources digital filters, which may be generated due to downlink transmissions such as PIM signals, intermodulation products, reflections from external sources, or any other sources. The mapping is performed on one or more of the cell resources, on one or more of the RRUs, and may be performed in one or more test points between the antenna and the interface to the BTSs along the uplink receive path.

Phase C—Activate One or More BTSs with Uplink Activity

Phase C is performed by activating one or more BTSs in full operational mode in with operational uplink activity and measuring and mapping any excessive noise or interference in the uplink cell resources digital filters, which may be generated due to any reason. The mapping is performed on one or more of the cell resources, on one or more of the RRUs, and may be performed in one or more test points between the antenna and the interface to the BTSs along the uplink receive path. Unlike phases A and B, which are intended to be done in commissioning and or maintenance phases in which the DAS is partially or fully nonoperational, phase C may be performed when the DAS is operational.

Figure 8:
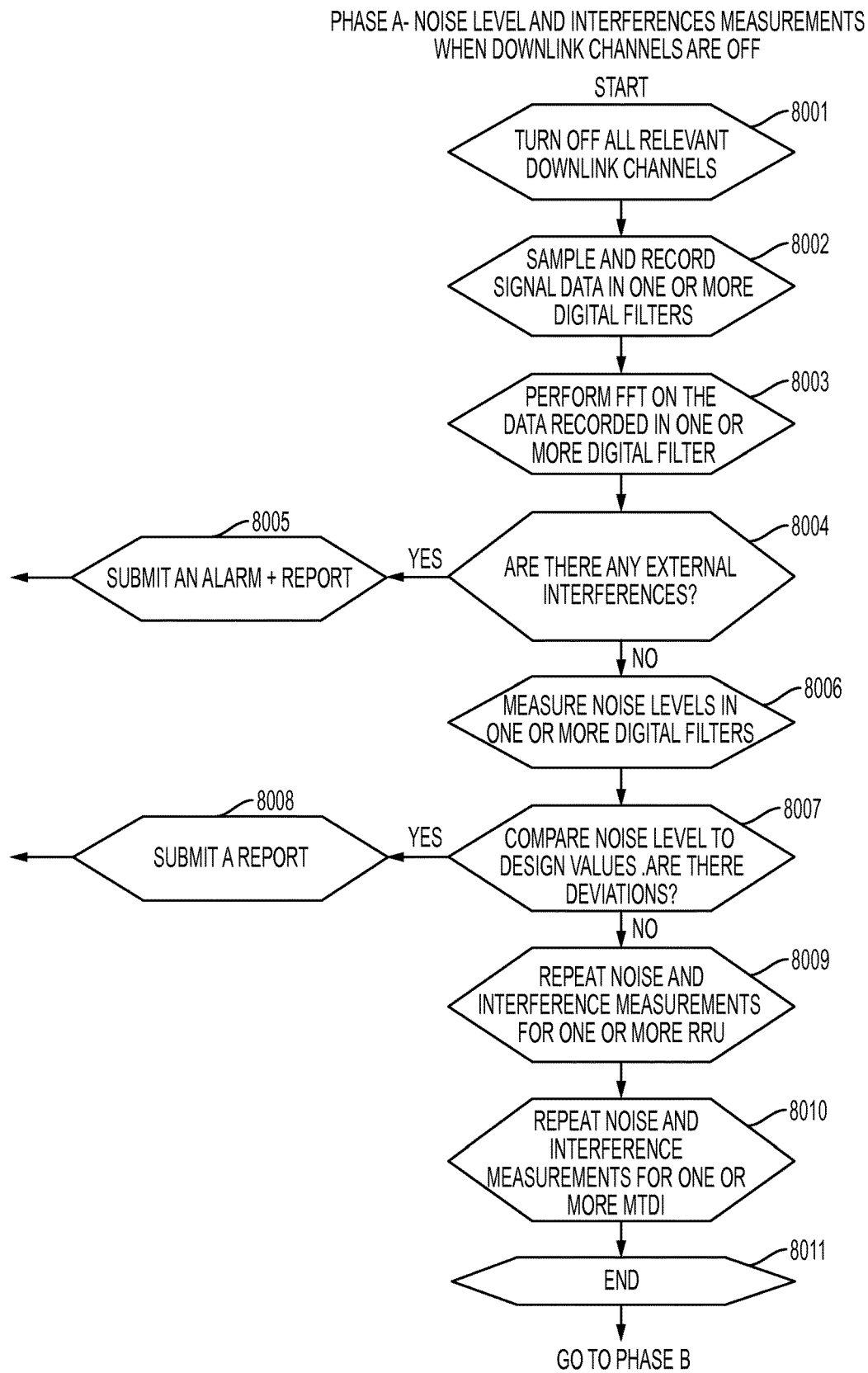
FIG. 8 depicts a flowchart for noise level and interference measurements when downlink channels are off.

FIG. 8 depicts a flowchart for performing phase A described above. This phase consists of measuring and recording noise levels and interferences in all the uplink cell resources digital filters in the digital filter bank (part of Digital processor 704 in FIG. 7) in one or more frequency bands and one or more RRUs. This is done when all the downlink channels are disconnected, switched off, or muted. It is performed sequentially on each RRU and may consist of the following steps with reference to FIG. 8:

Step 8001—ascertain that all the relevant DCC-DAS RRUs downlink channels are switched off, muted, or disconnected.

Step 8002—perform measurements of signal data in one or more of the uplink cell resources digital filters (FIG. 2C) in a first RRU digital filter bank (part of 704 FIG. 7). This step may be performed by the DAS controller 150 (FIG. 1) which may activate the digital processor (704 FIG. 7) in the one or more RRUs. The digital processor 704 may perform measurements of the data in each digital filter. This data may be recorded in the DCC-DAS database 189 (FIG. 1).

Steps 8003-8005—The digital processor 704 may also perform an FFT (fast Fourier transform) algorithm on the data in one or more digital filters in the digital filter bank in one or more RRUs. There may be some digital filters in an RRU in which there are external interferences which may prevent the system from proper noise level measurement. The FFT process, which is performed on the signal measurements in one or more digital filters, may identify the exact parameters of this interference such as interference level, central frequency, bandwidth, etc. (step 8004). A report may be sent (step 8005) by the digital processor (704 in FIG. 7) to the DAS controller 150 (FIG. 1) with all the interferences data which was identified in the one or more digital filters in 704. The DAS controller 150 may store this interference data in the DAS database 189 (FIG. 1) and also may send a report to the system integrator with this data. The system integrator may try to solve all the interferences issues.

Step 8006—Once this is done and all the interferences are eliminated or at least identified, the process may be repeated and the digital processors may perform noise measurement in one or more uplink digital filters of an RRU. All this data, including interferences signals which were not resolved, is recorded and sent to the DCC-DAS database 189.

Steps 8007 and 8008—The DAS controller 150 (FIG. 1) may compare the noise level measured in step 8006 to the desired design values for each cell resource filter. The system then sends a report with all the noise levels measured in the one or more uplink cell resource digital filters in the RRU. If the noise levels are higher or significantly lower than the desired design values, the DAS controller 150 may submit an alarm with a report delineating the malfunctioning cell resource digital filters. Such an alarm will also consist of a report delineating the RRU number, the specific bands in which there is a problem, and the specific cell resource filters in which there is a problem. If, however, the noise level measured in all the cell resource filters are within the range of the desired parameters for all the RRUs, it means that the system is well calibrated and the process proceeds to step 8009 (step 6).

Step 8009—The same procedure of interference and noise level measurements and mapping as depicted in Steps 8002-8008 are repeated and recorded for more or all RRUs in one or more or all their cell resource digital filters in one or more or all frequency bands. The purpose of this step is to ascertain that there is no any internal source of noise or interference in the DCC-DAS cables or modules anywhere between the RRUs and the DAS antenna.

Step 8010—The same procedure of interference and noise level measurements and mapping as depicted in Steps 8002-8009 may now be repeated and recorded for any element in the uplink receive path such as one or more MTDIs (such as 144 or 142 in FIG. 1) in one or more of their cell resource digital filters in the digital filter bank (318 in FIG. 3) in one or more frequency bands (FIG. 8 shows an MTDI as an example for a test point). The purpose of this step is to ascertain that there is no any internal source of excessive noise or interference in the DCC-DAS cables or modules anywhere between the RRUs and the interface to the BTSs.

Step 8011—By the end of phase A, all the noise levels of each cell resource digital filter in each band in each MTDI and RRU in the system are recorded and stored in the system controller database.

Figure 9:
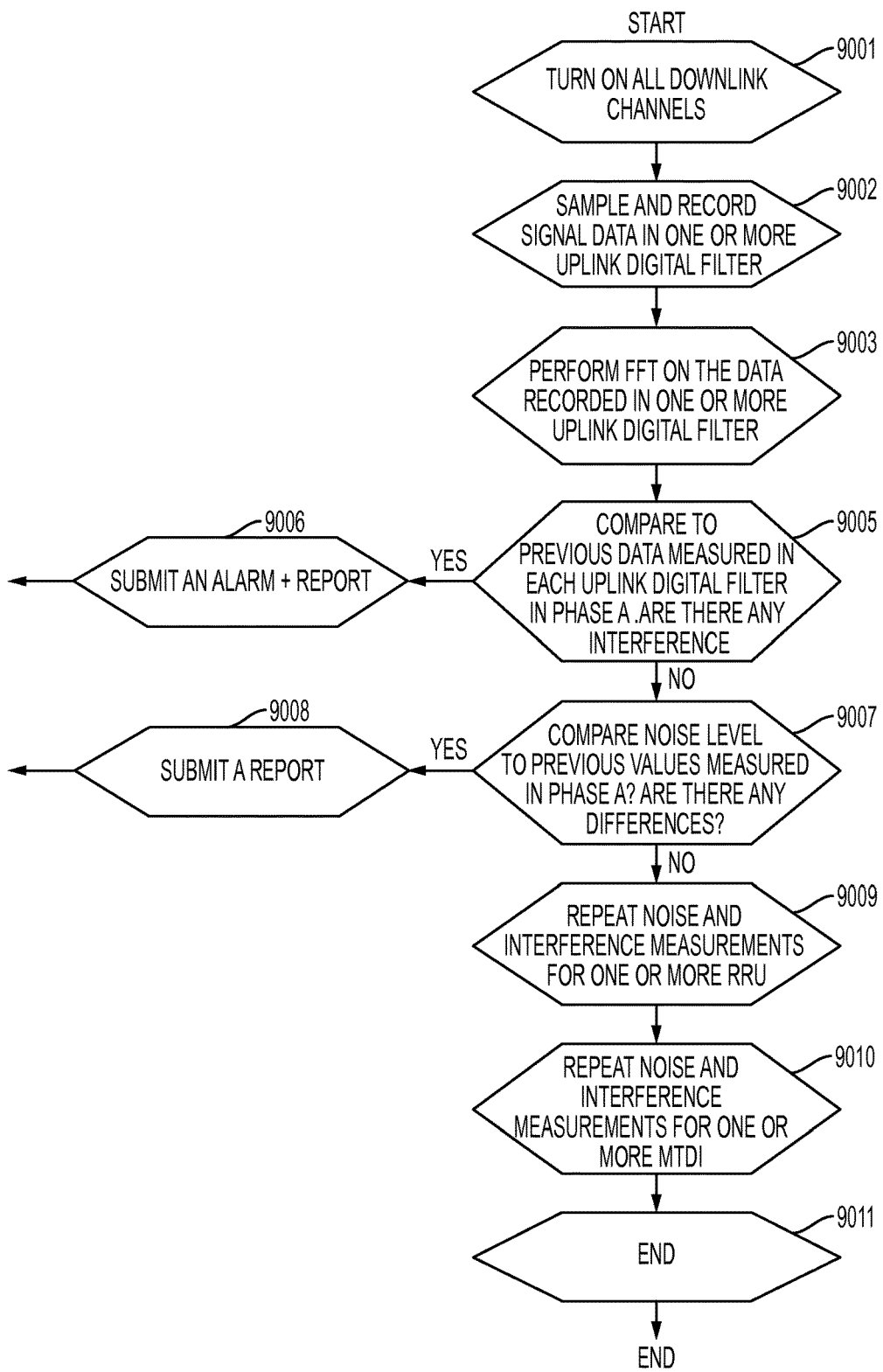

FIG. 9 depicts a flowchart showing the steps of Phase B. The activated DAS downlink channels are all in no traffic mode so that there is no uplink communication or activity. Alternatively, one more synthesizers which simulate downlink transmissions may be used. This phase consists of measuring and recording noise and interference levels in one or more or all RRUs when all the downlink channels are switched ON. It is performed on one or more or all the RRUs and may consist of the following steps:

Step 9001—Ascertain that one or more or all the DCC-DAS RRUs' downlink channels are switched ON and one or more or all the BTSs with their cell resources are ON. This phase B could be divided into two steps: one when all the BTSs are ON but at zero traffic conditions. In this mode, all the downlink channels are ON but there are no uplink signals that may interfere with the measurements. This BTS zero traffic mode can be used in the commissioning phase. In an operational phase, when the BTSs in the DAS head end room are in full traffic mode, there may be uplink signals in the building which will interfere with the noise and interference measurements. In this operational mode, the DCC-DAS system may disable uplink traffic just in a the specific cell resource in which there are currently measurements being performed while all the other cell resources are in full traffic mode. Thus, there is minimum disruption to the normal operation of the DCC-DAS.

Step 8002—perform measurements and recording of signal data in all the uplink cell resources digital filters (FIG. 2C) in a first RRU digital filter bank (part of 704 in FIG. 7). This step may be performed by the DAS controller 150 (FIG. 1) which may activate the digital processor (704 in FIG. 7) in the RRU. The digital processor 704 may perform measurements and recording of the data in one or more digital filter. This data may be stored in the DCC-DAS database 189 (FIG. 1).

Steps 8003-8006—the digital processor 704 FIG. 7 may also perform an FFT algorithm on the data in one or more digital filter in the digital filter bank in one or more RRUs. The FFT process may now be performed on the signal measurements in one or more digital filters may identify the exact parameters of each interference such as interference level, central frequency, bandwidth, etc. (step 9004). A report may be sent (step 9006) by the digital processor (704 in FIG. 7) to the DAS controller 150 (FIG. 1) with all the interferences data which was identified in each digital filter in 704 FIG. 7. The DAS controller 150 may store this interference data in the DAS database 189 (FIG. 1). The DAS controller 150 may now compare the FFT data generated in phase A with the FFT data generated in phase B. Any new interference that is now mapped and identified most likely has been generated by the downlink channels in the DCC-DAS RRUs and must have leaked to the uplink channels (One may opt to repeat this phase A just to ascertain that there are no any new non downlink related interferences). The DAS controller 150 may now send a report to the system integrator. This report depicts all the interferences caused by the downlink channels and all their parameters such as central frequency, bandwidth, interference level, the specific RRU in which this interference was detected, the specific band and specific cell resource digital filter which contains the interference. All this information may help the system integrator to identify the source of the problem and solve it and saves enormous time and costs which would have incurred if the integrator tried to identify the problem in the field without such reported measurements.

Steps 9007 and 9008—once all the interferences are dealt with, the DAS controller 150 (FIG. 1) may measure the noise levels in each uplink digital filter in the filter bank of the RRU and compare these values with the corresponding noise level measurements performed and stored in phase A. Any deviation between the two measurements is due to excessive noise generated in the downlink channels and leaking to the uplink channels. The system controller may now send a report to the integrator depicting all the noise measurements done in the RRU in each phase and showing the exact deviations between the two measurements together with the RRU number, the frequency band and the exact digital filter in which there is excessive noise.

Step 9009—the same procedure of interference and noise level measurements as depicted in steps 9002-9008 may now be repeated and recorded for one or more RRUs in one or more of its uplink cell resource digital filters in one or more frequency band and reports are sent accordingly.

Step 9010—the same procedure of interference and noise level measurements as depicted in blocks 9002-9009 may now be repeated and recorded for one or more MTDIs in one or more of its uplink cell resource digital filters in the digital filter bank (318 in FIG. 3) in one or more or all frequency bands. The purpose of this step is to ascertain that there is no any internal source of excessive noise or interference in the DCC-DAS cables or modules anywhere between the RRUs and the MTDIs. The DAS controller stores the measurements performed in this phase B in the DAS database 189 (FIG. 1). The DAS controller 150 may compare this data with the same data stored in phase A when the downlink channels were OFF. If there is any interference or excessive noise measured now which did not exist in phase A, it means that there is an internal source in one of the RRUs or the cables or the MSDH (130 in FIG. 1) that is generating an interference which is leaking to the MTDI uplink digital filters. The DAS controller 150 may now send a report to the system integrator depicting the exact MTDI, frequency band, digital filter in which the interference exists, the parameters of the interference such central frequency, bandwidth, intensity level etc. The DAS controller 150 may now switch off all the downlink channels of the DCC-DAS and switch each RRU in a sequence one at a time to isolate the problem and identify from each RRU and through each cable the interference is leaking. The DAS controller may store that data and send a report delineating the exact RRU and cable connection in which the problem originated.

Step 9011—by the end of this phases A and B, all the interferences in each uplink cell resource digital filter in each digital filter bank in each band in each MTDI and each RRU in the system whether generated by any external source or by the DAS downlink channels are identified, their parameters are measured and the location in which the problem originated is also identified. All the aforementioned information is stored in the DAS database 189 for future maintenance purposes.

Phase C, unlike phases A and B, which may be performed in non-operational mode when there is no uplink traffic, this mode may be performed when the BTSs and the DCC-DAS are fully operational and the measurement and mapping of the uplink interferences are performed in parallel to the operational uplink downlink activity of the DAS BTSs. In this operational mode, the system may disable uplink traffic just in the one or more specific cell resources in which there are currently measurements being performed while all the other cell resources of the DCC-DAS are in full traffic mode. Thus, there is a disruption to the operational activity of the DCC-DAS. However, it is confined only to the one or more cell resources which are being currently measured and mapped. The DCC-DAS in this mode remains fully operational in all other cell resources. The steps for Phase C are identical to those of Phase B depicted in FIG. 9. The only difference is that they are performed in an operational phase of the DCC-DAS and the DCC-DAS has full activity in all other cell resources in which currently no measurements are performed. One skilled in the art may realize that in certain cases and certain types of interferences the interference can be identified even in the presence of uplink traffic in the specific digital filters whose signals are being measured in which case the uplink traffic of this cell resource does not have to be inhibited.

Although this algorithm teaches about performing FFT algorithm in order to separate and identify any uplink interference from the desired signal and system noise, one skilled in the art could use any other procedure which helps separate an interfering signal from noise and desired signals and thus enables to measure the interference parameters.

This application teaches mainly about measuring and mapping uplink interferences in a DCC-DAS. However, the same methodology and procedures could be used for an analog DAS. In a case of an analog DAS, a frequency band receiver with a variable bandwidth could be added to various modules of the DAS such as the RRU or the master hub or the BTS interface unit, a digital sampling unit and processor could be added to the receiver and thus this receiver and the digital unit could perform the same algorithms as aforementioned.

The aforementioned procedure with its phases A, B and C could be for example activated in one or more of the following occasions:

a. in the commissioning phase of the DCC-DAS before the DAS becomes operational.

b. on a regularly scheduled basis. For example once in a while as may be decided by the operator. The DAS controller 150 scheduler will initiate this procedure. As aforementioned the DAS controller may disable (by communicating with the operator NMS) the traffic only in a specific cell resource in which current measurements are made. Thus, all the BTSs cell resources except the one which is being measured are ON and the disruption to the users traffic is minimized.

c. event driven—when there is a suspicion that that one or more of the BTS's uplink channels are malfunctioning.

d. in any other case whether activation is done manually or automatically.

The aforementioned procedure with its phases A, B and C teaches about sending a report to the system integrator whenever an interference caused by the DAS or by an external source is measured and mapped. (see for example blocks 8005, 8008 in FIGS. 8 and 9006, 9008 in FIG. 9). However in parallel or in lieu of sending the report the DAS controller may try to handle or deal with the problem independently. For example:

a. the DAS controller 150 could switch off one or more uplink or in the downlink specific cell resource digital filters in which any kind of interference was identified.

b. the DAS controller 150 could switch off one or more bands in one or more RRUs which are found to be a root cause of uplink interferences.

c. the DAS could attenuate the downlink power of one or more RRUs or cell resources which are found causing interferences to specific uplink channels.

We claim:

1. A method for automatic mapping and handling of noise and interference in a distributed antenna system (DAS), the method comprising:

measuring any excessive noise and interference in one or more of the uplink cell resources matched digital filters of the DAS when one or more downlink channels of the DAS are transmitting in a zero traffic mode, wherein the DAS comprises:

a plurality of remote radio units (RRUs) in communication with mobile devices;

a central digital hub for routing and processing digital RF signals, wherein the central digital hub is coupled to the RRUs and to the base transceiver stations (BTS's);

at least one uplink digital filter bank comprising a plurality of uplink digital filters in at least one RRU of the plurality of RRUs, wherein one or more of the uplink digital filters is matched to a corresponding cell resource, each cell resource including at least one or more signals being received from one or more of the mobile devices in an uplink direction, there being at least two separate and distinct cell resources;

comparing the measured excessive noise and interference in the uplink cell resources matched digital filters to a desired corresponding noise level, wherein the desired corresponding noise level is determined by a layout of the DAS; and generating a mapping of the excessive noise and interference based on the comparison.

2. The method of claim 1, further comprising:

generating an excessive noise and interference report based on the comparison.

3. The method of claim 1, wherein the desired corresponding noise level is determined by measuring any excessive noise and interference before the DAS becomes operational.

4. The method of claim 1, wherein the desired corresponding noise level is determined by measuring any excessive noise and interference in one or more uplink cell resources of the DAS when one or more downlink channels of the DAS are not transmitting.

5. The method of claim 1, wherein the measuring is performed in one or more uplink channels on one or more RRUs of the DAS.

6. The method of claim 1, wherein the measuring is performed on one or more DAS test points between an antenna and an interface of a BTS along an uplink receive path.

7. The method of claim 1, further comprising:

automatically adjusting gain of one or more uplink channels or downlink channels based upon the comparison.

8. The method of claim 1, further comprising:

automatically adjusting downlink power of one or more RRUs or cell resources based upon the comparison.

9. The method of claim 1, further comprising:

automatically switching off downlink power to one or more cell resources based upon the comparison.

10. The method of claim 1, wherein the DAS performs the comparison on a regularly scheduled basis.

11. The method of claim 1, wherein the DAS performs the comparison when there is a suspicion that that one or more BTS uplink channels are malfunctioning.

12. The method of claim 1, wherein the DAS utilizes a fast Fourier transform algorithm in order to separate and identify any uplink excessive noise and interference from uplink desired signals in the comparison.

13. The method of claim 1, wherein the measuring and comparison are performed in one or more uplink channels of one or more RRUs of the DAS to determine in which RRU the excessive noise and interference is received.

14. A distributed antenna system for coupling to a plurality of base transceiver stations (BTS's) comprising:

a plurality of remote radio units (RRUs) in communication with mobile devices;

a central digital hub for routing and processing digital RF signals, wherein the central digital hub is coupled to the RRUs and to the BTS's;

at least one uplink digital filter bank comprising a plurality of uplink digital filters in at least one RRU of the plurality of RRUs, wherein one or more of the uplink digital filters is matched to a corresponding cell resource, each cell resource including at least one or more signals being received from one or more of the mobile devices in an uplink direction, there being at least two separate and distinct cell resources;

wherein, pin one or more uplink cell resources matched digital filters of the DAS, a processor of the DAS performs the steps of:

measuring any excessive noise and interference in one or more of the uplink cell resources matched digital filters of the DAS when the one or more downlink channels of the DAS are transmitting in a zero traffic mode;

comparing the measured uplink cell resources excessive noise and interference in the uplink cell resources matched digital filters to a desired corresponding noise level, wherein the desired noise level is determined by a layout of the DAS; and generating a mapping of the excessive noise and interference based on the comparison.

15. The method of claim 14, wherein the processor generates an excessive noise and interference report.

16. The system of claim 14, wherein the processor determines the desired corresponding noise level by measuring any excessive noise and interference in one or more uplink cell resources matched digital filters of the DAS when one or more downlink channels of the DAS are not transmitting.

17. The system of claim 14, wherein one or more BTSs coupled to the DAS has the means to be activated in zero traffic mode.

18. The system of claim 14, wherein one or more signal source synthesizers in the DAS has the means to be activated to simulate channels in a zero traffic mode transmission.

19. The system of claim 14, where excessive noise or PIM generated by one or more downlink transmissions is measured and mapped in one or more test points between an antenna and an interface to the BTSs along an uplink path of the DAS.

20. The system of claim 14, wherein the DAS has the means to automatically change one or more DAS settings such as gain, digital filters, routing, transmission power according to one or more parameters of the one or more excessive noise levels or interferences in the one or more cell resources.

21. The system of claim 14, wherein the processor sends an alarm to a user delineating one or more parameters of the one or more excessive noise levels or interferences in the one or more cell resources.

22. The system of claim 14, wherein the excessive noise and interference includes passive intermodulation product (PIM) signals.

23. The method of claim 1, wherein the excessive noise and interference includes passive intermodulation product (PIM) signals.

* * * * *